United States Patent
Chrysanthakopoulos et al.

(10) Patent No.: US 12,269,530 B2
(45) Date of Patent: Apr. 8, 2025

(54) MODULAR, COST-EFFECTIVE, FIELD REPAIRABLE CHASSIS AND MECHANICAL COMPONENTS FOR HEAVY DUTY AUTONOMOUS ROBOT

(71) Applicants: Georgios Chrysanthakopoulos, Seattle, WA (US); Adlai Felser, Seattle, WA (US)

(72) Inventors: Georgios Chrysanthakopoulos, Seattle, WA (US); Adlai Felser, Seattle, WA (US)

(73) Assignee: DCENTRALIZED SYSTEMS, INC.

( * ) Notice: Subject to any disclaimer, the term of this patent is extended or adjusted under 35 U.S.C. 154(b) by 0 days.

(21) Appl. No.: 18/509,149

(22) Filed: Nov. 14, 2023

(65) Prior Publication Data
US 2024/0083504 A1    Mar. 14, 2024

Related U.S. Application Data

(62) Division of application No. 17/185,903, filed on Feb. 25, 2021, now Pat. No. 11,858,551.
(Continued)

(51) Int. Cl.
*B62D 21/10*    (2006.01)
*B21D 47/00*    (2006.01)
(Continued)

(52) U.S. Cl.
CPC ............. *B62D 21/10* (2013.01); *B21D 47/00* (2013.01); *B60K 1/02* (2013.01); *B60L 8/00* (2013.01);
(Continued)

(58) Field of Classification Search
CPC ...... B62D 63/025; B62D 23/00; B21D 11/20; B25J 5/007
See application file for complete search history.

(56) References Cited

U.S. PATENT DOCUMENTS 4,489,976 A * 12/1984 Flaherty ................. B63B 3/185
114/353
5,419,629 A * 5/1995 Korinsky ................ G06F 1/184
361/679.48
(Continued)

FOREIGN PATENT DOCUMENTS

FR        3022476 A1 * 12/2015 ........... B62D 25/087
KR    101871157 B1 *  7/2018

OTHER PUBLICATIONS

FR-3022476-A1 translation (Year: 2015).*
KR101871157B1 Machine Translation (Year: 2018).*

*Primary Examiner* — Michael W Hotchkiss
(74) *Attorney, Agent, or Firm* — Apex Juris, pllc; Tracy M Heims

(57) ABSTRACT

A method of creating a configurable, uni-member, bended frame chassis comprising the steps of having a single sheet of material; forming holes at predetermined locations in said single sheet of material; using the single sheet of material and forming a base, a first side, a second side, a first top plate and a second top plate by; bending the material lengthwise and upwardly and forming the first side; bending the material lengthwise and upwardly and forming the second side; and having the base formed between the first side and the second side; bending the material lengthwise at a top of the first side and forming the first top plate; and bending the material lengthwise at a top of the second side and forming the second top plate.

13 Claims, 43 Drawing Sheets

Related U.S. Application Data

(60) Provisional application No. 62/981,400, filed on Feb. 25, 2020.

(51) Int. Cl.
    *B60K 1/02* (2006.01)
    *B60L 8/00* (2006.01)
    *B62D 63/02* (2006.01)
    *B62D 63/04* (2006.01)
    *B62D 65/02* (2006.01)
    *E02F 3/34* (2006.01)
    *E02F 9/20* (2006.01)

(52) U.S. Cl.
    CPC ........... *B62D 63/025* (2013.01); *B62D 63/04* (2013.01); *B62D 65/02* (2013.01); *B23P 2700/50* (2013.01); *B60L 8/003* (2013.01); *E02F 3/34* (2013.01); *E02F 9/205* (2013.01)

(56) References Cited

U.S. PATENT DOCUMENTS

| | | | | |
|---|---|---|---|---|
| 8,438,893 | B2* | 5/2013 | Durney | B65D 7/08 |
| | | | | 72/332 |
| 9,193,402 | B2* | 11/2015 | Chin | B08B 1/165 |
| 10,906,585 | B2* | 2/2021 | Xiong | B62D 63/02 |
| 11,001,443 | B1* | 5/2021 | Skaloud | B62D 63/04 |
| 11,376,750 | B2* | 7/2022 | Radetzki | B25J 19/0029 |
| 2007/0262128 | A1* | 11/2007 | Durney | B62D 25/14 |
| | | | | 229/132 |
| 2008/0100258 | A1* | 5/2008 | Ward | H01M 10/465 |
| | | | | 320/101 |
| 2009/0100894 | A1* | 4/2009 | Durney | B21D 11/10 |
| | | | | 72/379.2 |
| 2009/0188100 | A1* | 7/2009 | Durney | B62D 25/14 |
| | | | | 29/469 |
| 2015/0075880 | A1* | 3/2015 | Grossen | A01D 46/243 |
| | | | | 180/2.2 |
| 2017/0063290 | A1* | 3/2017 | Kurlagunda | B60L 8/003 |
| 2020/0017145 | A1* | 1/2020 | Xiong | B62D 21/18 |

\* cited by examiner

MODULAR, COST-EFFECTIVE, FIELD REPAIRABLE CHASSIS AND MECHANICAL COMPONENTS FOR HEAVY DUTY AUTONOMOUS ROBOT

RELATED APPLICATIONS

This application claims the benefit of U.S. patent application Ser. No. 17/185,903, filed Feb. 25, 2021 and entitled MODULAR, COST EFFECTIVE, FIELD REPAIRABLE CHASSIS AND MECHANICAL COMPONENTS FOR HEAVY DUTY AUTONOMOUS ROBOT, and U.S. Provisional Patent Application Ser. No. 62/981,400, filed Feb. 25, 2020, both incorporated herein by reference.

BACKGROUND OF THE INVENTION

Field of the Invention

This invention relates to a configurable frame body having a single panel, uni-member U-shaped bended frame where the frame has a base, a first side, a first side upper plate, a second side, a second side upper plate, a first end, a second end and a plurality of cutouts positioned at predetermined locations in the U-shaped bended frame. Specifically, this frame is used for a ground utility robot, autonomous robot, or autonomous tractor, and more specifically to a chassis and frame design, wheel attachments, batteries, solar panels and solar panel attachments, implement attachments, component attachments and accessory attachments to the robot. It also teaches a cost effective, reduced part count, high strength chassis, drive unit and modular assemblies for autonomous multi-purpose electric outdoor land care robot and or to human operated machines or hybrid machines that are easily assembled, simple in design, small in part count and that are rapidly field-repairable.

Description of the Prior Art

The present invention deals generally with chassis configuration and design and specifically with products in the field of ground utility robot units, land care robots or LCRs, and particularly those land care robots used outdoors for a variety of activities. However, the disclosures herein also teach how any type of machine capable of performing heavy work can be quickly and cost-effectively manufactured, be field repairable and can perform a variety of tasks safely and easily. The teachings herein do not just relate to autonomous vehicles or robots. This teaching is also applicable to human operated machines or even hybrid machines that combine autonomy with human oversight. Currently, in the autonomous robot field, outdoor robots are typically large, cumbersome, awkward, expensive, and have limited capability. While small, autonomous robots exist, they are not that much easier to manufacture or repair than larger ones. They are typically designed to perform a singular task, they cannot work in an unstructured environment, and they generally operate using a combustion engine or electric motors powered by electricity obtained from some sort of power supply, such as a rechargeable battery, where the battery has to be removed or plugged in to an electricity source in order to recharge. These outdoor robots have limited range and operability due to the limitations of their battery, their software, their power needs, their configuration, their ruggedness, their means of manufacture and the size of the devices. Generally speaking, existing outdoor robots are extremely large, require massive power to operate, are complicated (both in operation and design) and are excessively expensive to manufacture, to maintain, and to operate. The same is true for most if not all machines used for nearly any type of heavy work. The present invention is designed to address all of these existing issues and additional problems in the outdoor autonomous land care robot field, the autonomous vehicle field, the autonomous robot field and the field of human-operated and/or hybrid human/robot operated machines.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

These and other aspects of the invention will be apparent from and elucidated with reference to the embodiment(s) described hereinafter.

SUMMARY OF THE INVENTION

In view of the foregoing it is an object of the present invention to provide a cost effective, reduced part count, high strength chassis, drive units and modular assemblies for autonomous multi-purpose electric outdoor ground utility robots, land care robots, human operated machines and hybrid machines, that are all easily assembled, modified, repaired and rapidly field repairable.

It is another objective of the present invention to provide a machine (e.g., an LCR) LCRs with a plethora of safety features.

It is still another objective of the present invention to provide implements, attachments and accessories that are easily attachable to and detachable from the machine (e.g. an LCR).

It is still another objective of the present invention to provide a cost effective, easily constructible machine (e.g., an LCR) having extreme versatility and modularity. Another objective is to have machines that are (i) entirely computer controlled and autonomous; or (ii) that can be human operated; or (iii) that can be a combination of the two.

The present invention achieves these objectives and other objectives in the ways described in the following detailed description of the preferred embodiments of the invention, including the modular frame or chassis, assembly components and accessories.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the inventive subject matter.

DETAILED DESCRIPTION OF THE EMBODIMENTS

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, various examples of the ground utility robot, or land care robot units and their configurations are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature or example.

The invention will now be described in detail with reference to the attached drawings. As described above in the summary there is a need for a configurable frame chassis having a single panel, uni-member U-shaped bended frame chassis that is modular, is multi-purpose, that is cost effective, has a reduced part count, that is used as a high strength chassis along with high strength parts and drive units, that features modular assembly and that is rapidly field-repairable. The present invention can be used for myriad types of devices and machines (e.g., human operated devices, autonomous devices, hybrid machines, that is, machines that are a combination of human operated and autonomous). The chassis can be used for a variety of purposes, including but not limited to land care robots. In the area of outdoor field robots, also known as land care robots, or LCRs, there are offerings that are beginning to enter the market, but they are typically large units that are extremely complicated to build and use. More importantly, they are excessively expensive to manufacture and thus purchase. These limitations curtail customer demand. The same is true for human operated machines and hybrid machines.

Figure 11:
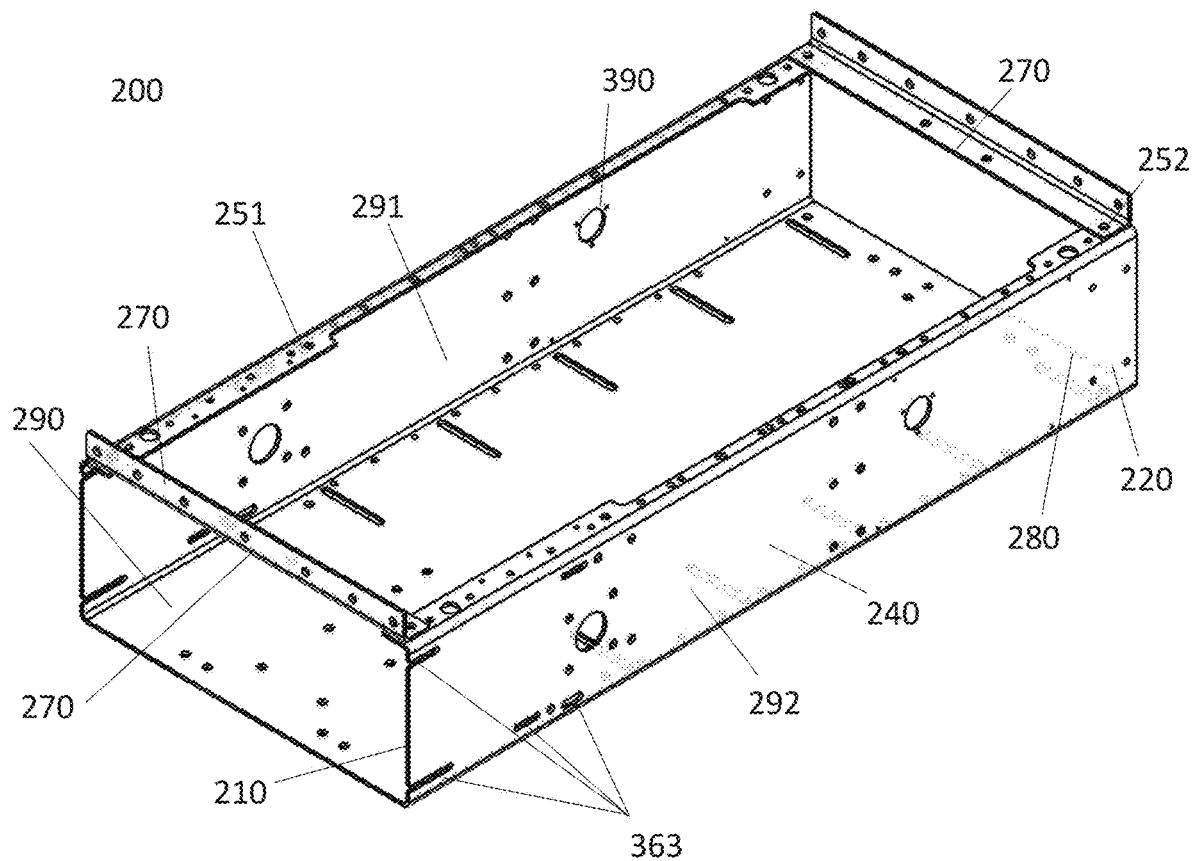
FIG. 11 is an elevated view of a single panel, uni-member U-shaped bended chassis.
Figure 12:
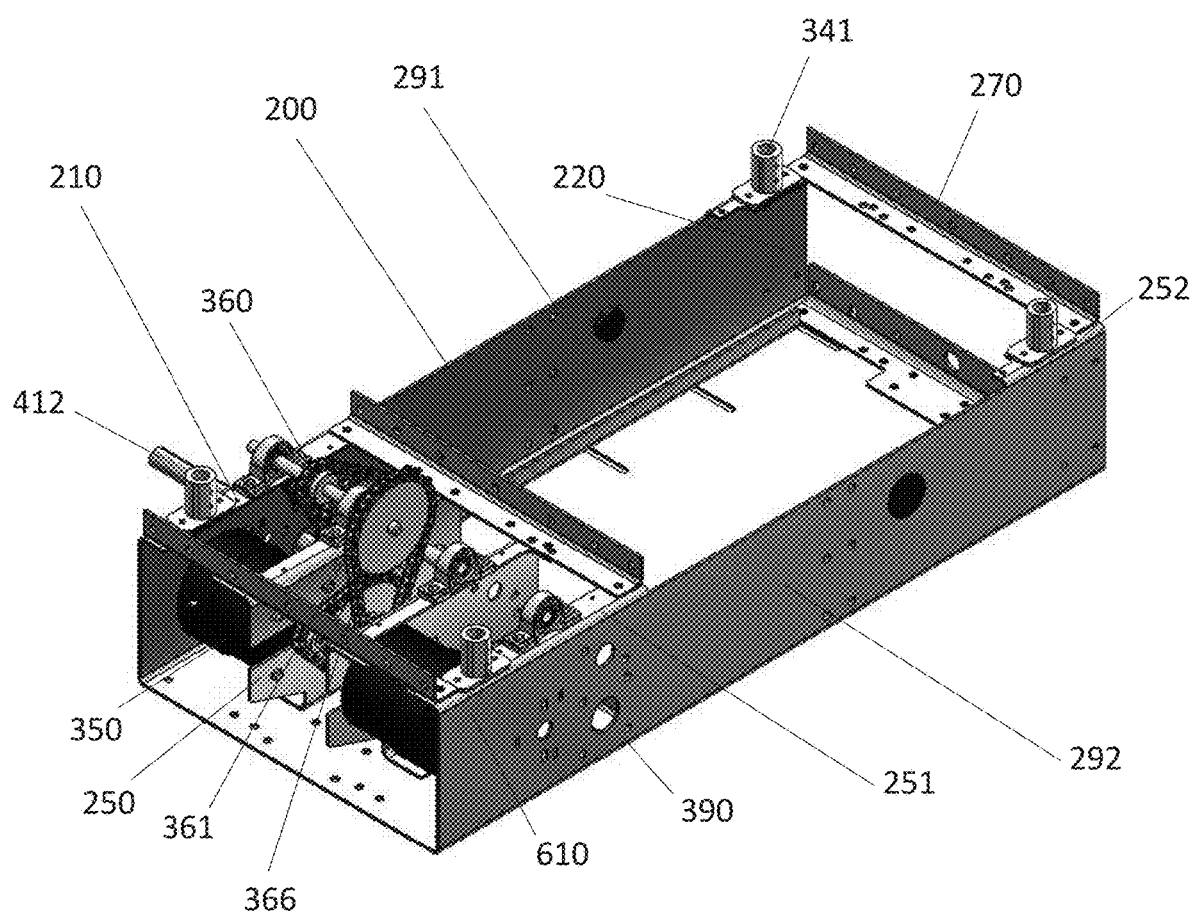
FIG. 12 is an elevated view of the single panel, uni-member U-shaped bended frame chassis with a second chain reduction and gearing mechanism.
Figure 43:
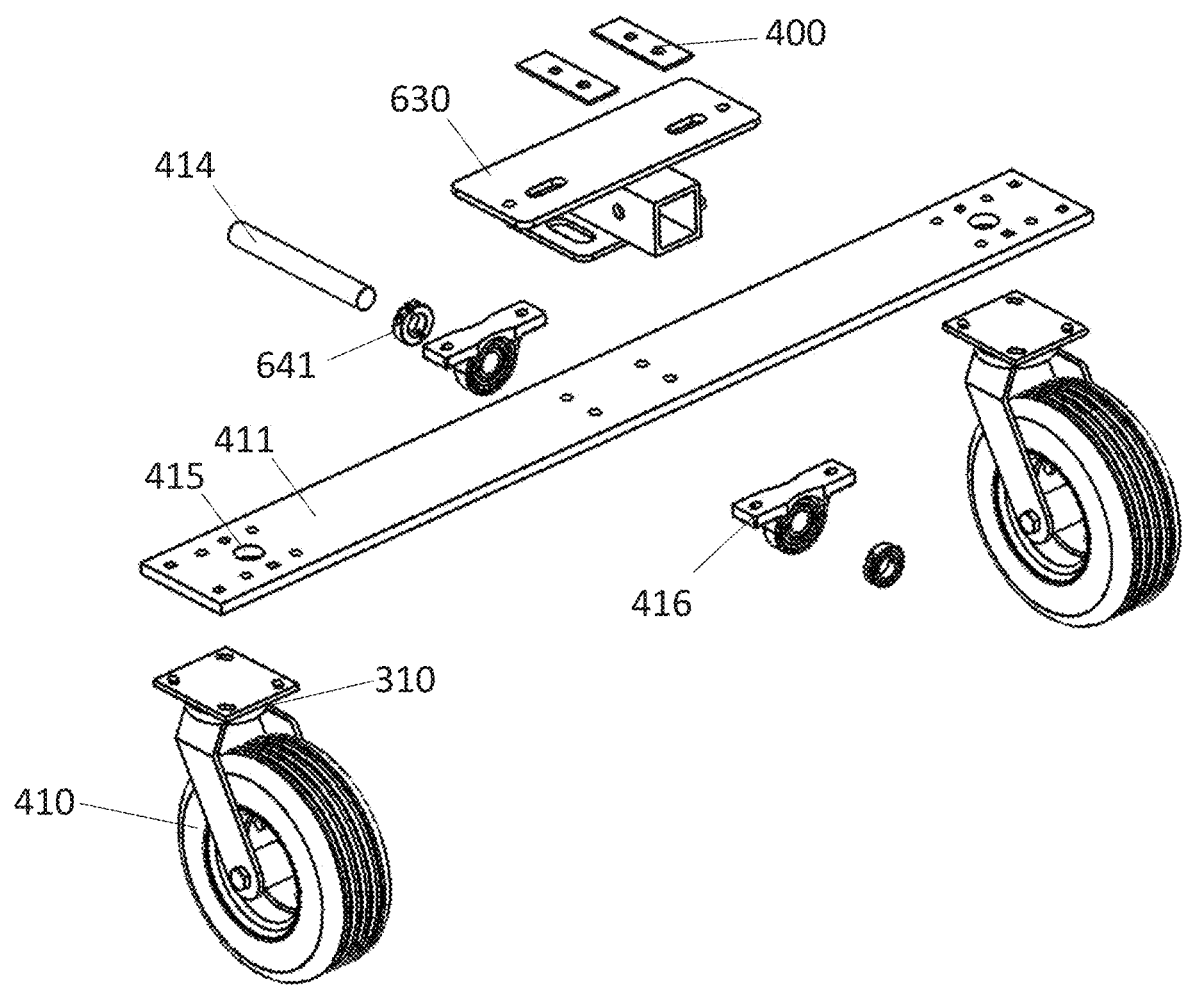
FIG. 43 is an exploded view of the seesaw Caster of FIG. 42.

The present invention relates to a configurable chassis for machines and more specifically to a configurable chassis for use with an LCR. This chassis can be used for a variety of other purposes and will be described in detail first. The main purpose of this chassis is to have a frame that is easily and efficiently manufactured, that is designed so that body parts and accessories can be easily added or removed, that has parts that are easily changed out and replaced, even in the field, and that is inexpensive to manufacture. FIGS. 11, 12 and 43 show the basic frame and body parts and how they go together. All parts are secured one to another using fasteners that are off the shelf bolts, nuts and washers of various size. In its broadest embodiment there is a configurable frame body having a single panel, uni-member U-shaped bended frame chassis 200 where the frame has a base 290, a first side 291, a first side upper plate 251, a second side 292, a second side upper plate 251, a first end, a second end and a plurality of cutouts 390 positioned at predetermined locations in the U-shaped bended frame chassis 200. This is an extremely easy yet beautifully simple design. The chassis build starts with a clean, flat, rectangular piece of metal. This piece can be made from steel, stainless steel, aluminum, copper, chromium, titanium, or any other material that is strong and reliable. This clean sheet is first punched, drilled, laser cut, water cut, or any other method useable to place cutouts 390 about the surface at predetermined positions. This can be done using a cutter or punch and a programmed computer so that the cutouts 390 are consistent, exact and specific in positioning. After the cutouts are completed, the sheet moves to a bending machine. This can be done manually but ideally is performed on a CNC machine or some other controlled device. Computer numerically controlled (CNC) bending is a manufacturing process that is carried out by CNC press brakes (also known as CNC brake presses). These machines can bend sheet metal work from just a few mm across to sections many meters long on the largest industrial machines. This machine bends the metal and forms the basic chassis design. This design has the base 290, two sides 291, 292 and a lip or upper plates 251 on each side and is clearly seen in FIGS. 11 and 12. This upper plate 251 is to provide an attachment surface for other parts. Once complete, there is a configurable, single panel, uni-member U-shaped bended frame 200, as in FIG. 11.

Next, the frame requires bracing and reinforcing. Bracing is accomplished by adding a number of cross-body connecting members 270. The configurable frame chassis 200 has at least one cross-body connecting member 270 affixable at multiple locations about the U-shaped bended frame chassis 200 at the plurality of cutouts 390 in the predetermined locations where the at least one cross-body connecting member 270 has a first end, a second end, and a length that is approximately the same length as a distance between the first side 291 and the second side 292 of the configurable frame chassis 200. The assembly also requires fasteners 252 to connect the at least one cross-body connecting member 270 to the U-shaped bended frame chassis 200, and where the first end of the at least one cross-body connecting member 270 is affixed to the first side 291 and the second end of the at least one cross-body connecting member 270 is affixed to the second side 292 with the fasteners 252. Again, this is extremely efficient in design as the same connecting member can be used at multiple locations around the U-shaped bended frame to provide support. In addition, it is preferable to use the same fastener 252 for all connections but it is also possible to use a limited number of sized fasteners to accomplish securement. This minimizes manufacturing expense, limits part counts and eases the building process.

Figure 42:
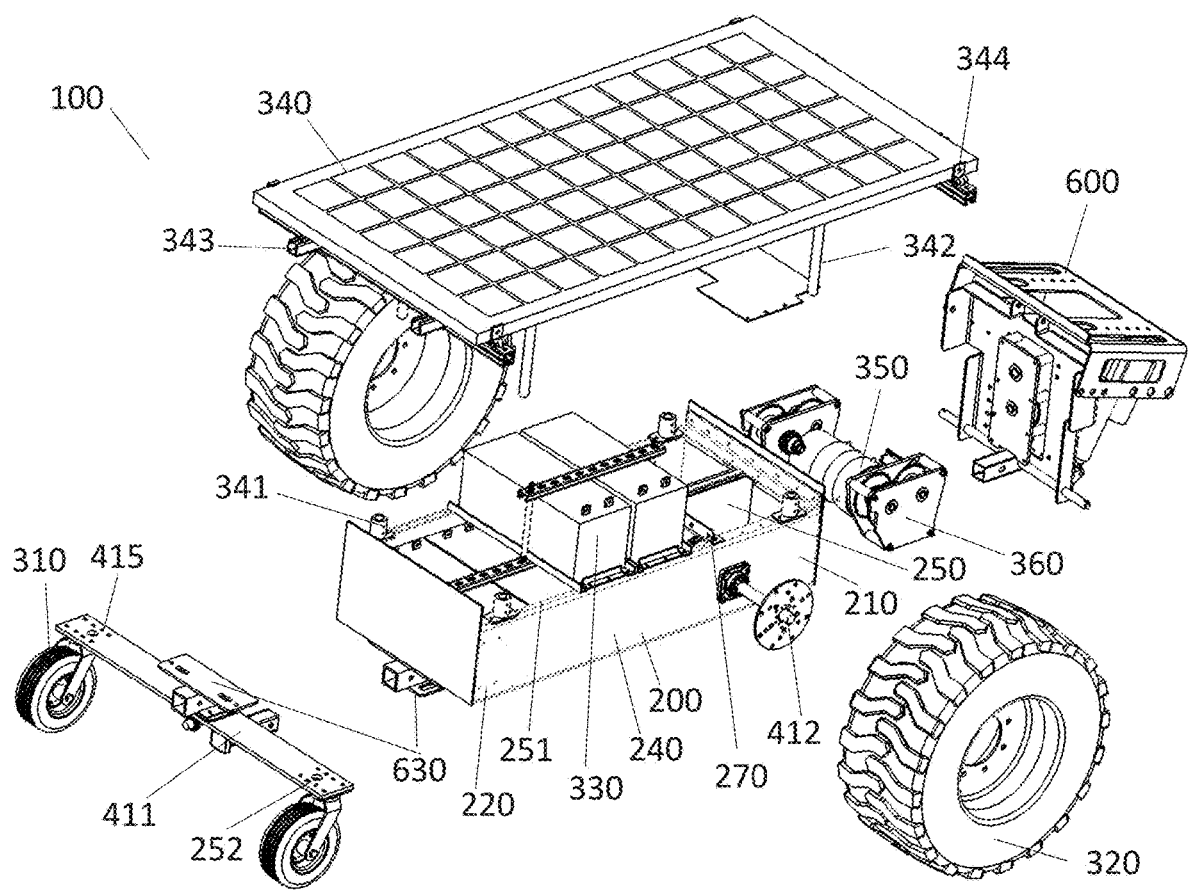
FIG. 42 is an elevated perspective exploded view of the LCR of the present invention with a seesaw caster Assembly.

After the skeletal frame is complete, the body parts are added. The configurable frame chassis 200 further has matingly affixable body parts where the matingly affixable body parts are attachable to the configurable frame with the fasteners 252 at the cutouts 390 at the predetermined locations. By design, the cutouts 390 match the mating body parts and again, it is preferable to use the same or substantially similar fasteners 252. This design makes it extremely easy to add body parts to the chassis, as is shown in FIGS. 11, 12 and 42

FIGS. 1-6, 15-36 show a wide range of rotatable member mounts 420 and the rotatable members 310, 320. These rotatable members can be wheels, treads, tracks, balloon tires, aeration wheels, solid rubber wheels, or any other type of rotational member. As shown in FIGS. 1-6 the configurable frame body has matingly affixable body parts that are a pair of first end rotatable member mounts 420 affixable to the frame body chassis 200 at the first end 210 on the first side 291 and the second side 292, a pair of second end rotatable member mounts 420 affixable to the frame body at the second end on the first side 291 and the second side 292; and where the rotatable member mounts 420 are affixable to the frame body with the fasteners 252 at the mating cutouts 390 at the predetermined locations. After the member mounts 420 are in place and secured to the U-shaped chassis 200 with the fasteners 252 the rotatable members 310, 320 are added to the mounts 420.

The rotatable members 310, 320 can be any number of a wide variety of members. As above, the type, style and design of the members are broad and varied and it is up to the user and the application to decide which is best suited for the task at hand. In order for the device to be moveable one or more of the rotatable members 310, 320 is driven. Again, there is a wide range of opportunity with the current design. In one embodiment one set of rotatable members are freewheeling and are not powered or driven. In one embodiment these can be caster wheels, and again, there are a number of configurations possible, several of which are described herein below. They can be plate casters, stem casters, leveling casters, pneumatic or solid rubber casters, side mount casters, a seesaw caster design can also be used, as described below, or any other imaginable caster type. As shown in FIGS. 1-6 and FIG. 23 these are easily installed and removed from the chassis.

The main idea behind this chassis configuration is to have an easily configurable chassis system that is simple to assemble and simple to add a mechanism or apparatus that provides power. In order to accomplish this, other parts need to be added to the chassis. For the apparatus to be driven, at least one of the first end rotatable members or at least one of the second end rotatable members must be power-driven. The device would work by driving only one wheel, but it is preferred that at least one set of members is driven. In another embodiment both sets are driven so that the apparatus is now effectively a four-wheel drive device. In order to drive the rotatable members power must be added to the U-shaped chassis 200. In one embodiment the LCR utilizes a differential drive. That is, it is an LCR whose movement is based on two separately driven wheels placed on either side of the robot body. It can thus change its direction by varying the relative rate of rotation of its wheels and hence does not require an additional steering motion. If both the wheels are driven in the same direction and speed, the LCR will go in a straight line. If both wheels are turned with equal speed in opposite directions, then the robot will rotate about the central point of the axis, thus providing a zero-turn radius. Otherwise, depending on the speed of rotation and its direction, the center of rotation may fall anywhere on the line defined by the two contact points of the tires. While the LCR is traveling in a straight line, the center of rotation is an infinite distance from the robot. Since the direction of the robot is dependent on the rate and direction of rotation of the two driven wheels, these quantities are sensed and controlled precisely. This differential steering LCR is similar to the differential gears used in automobiles in that both the wheels can have different rates of rotations, but unlike the differential gearing system, this differentially steered system powers both wheels. The vehicle improves on the two wheel (or tracked) differential drive by using casters on the opposite end, to reduce the energy required to turn. The casters can be powered (motors driving them) or un-powered and will self-orient to the direction of motion. Using casters on the far end of the vehicle reduces the load on each driven axle and improves the stability of the robot. Using spring mounted or canti-levered casters further improves the traction of the dual driven wheels since it conforms to the terrain and pushes the center of gravity towards the driven wheels (or tracks). This design provides motion that is easy to program and control and the system itself is simple and is relatively inexpensive.

To add power to the U-shaped chassis several things must happen. First, a power source must be added to the chassis. The power source could be a fuel cell, a hydrogen fuel cell, a gas engine, a propane engine, a battery or any other power source but is preferably a rechargeable battery 330. The battery 330 can be configured and/or manufactured to have tie downs to attach it to the chassis, but most likely will sit in a frame that will matingly fit to the chassis 200 where the frame will have holes or cutouts that matingly fit the cutouts 390 in the chassis 200 at the predetermined locations and then the battery 330 is secured at these locations using the fasteners 252. Next, the rechargeable battery 330 must be capable of being recharged.

Figure 1:
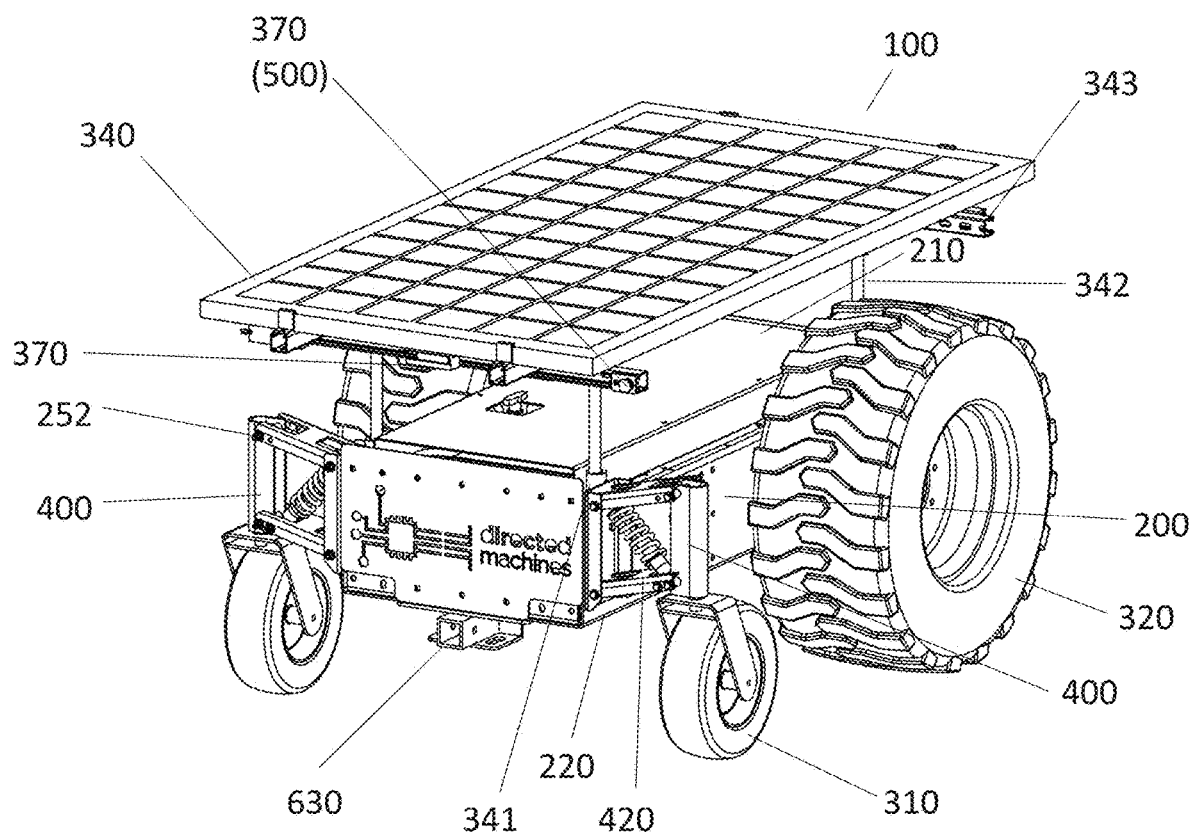
FIG. 1 is an elevated view of a first, completed embodiment of the LCR from the front.
Figure 2:
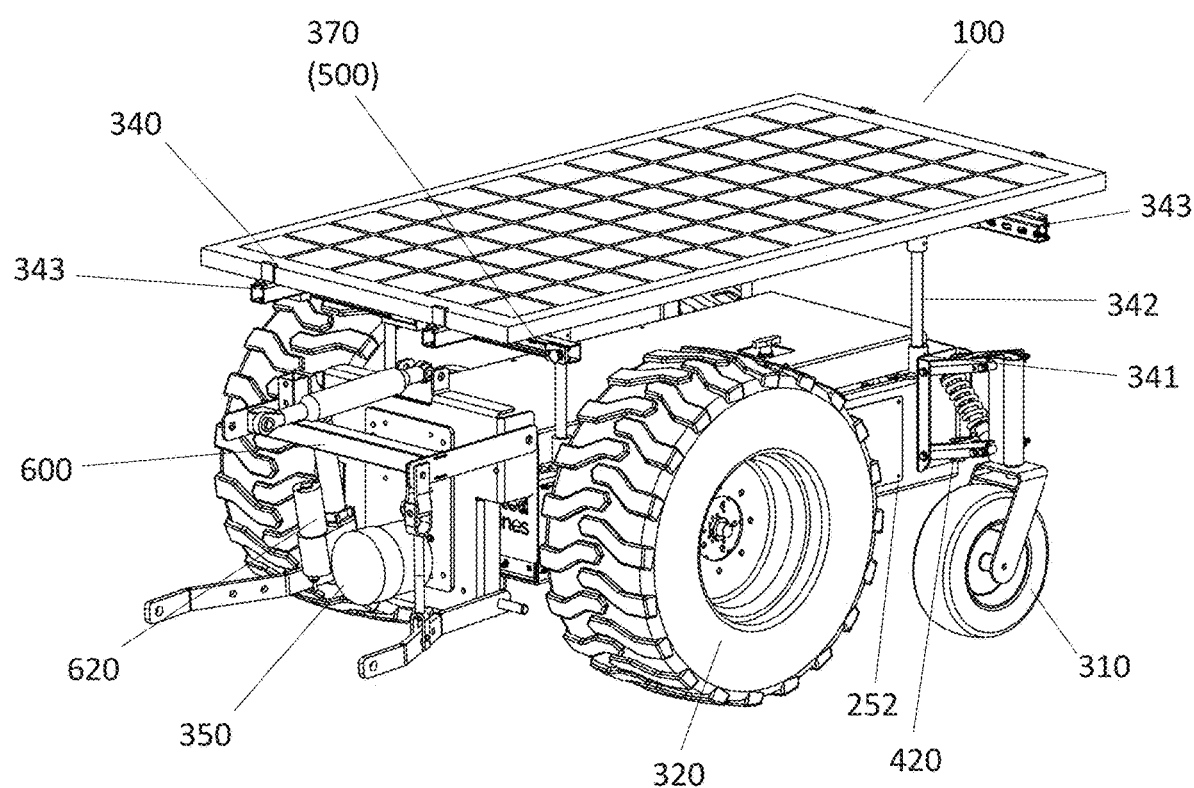
FIG. 2 is an elevated view of a first, completed embodiment of the LCR from the back side.
Figure 3:
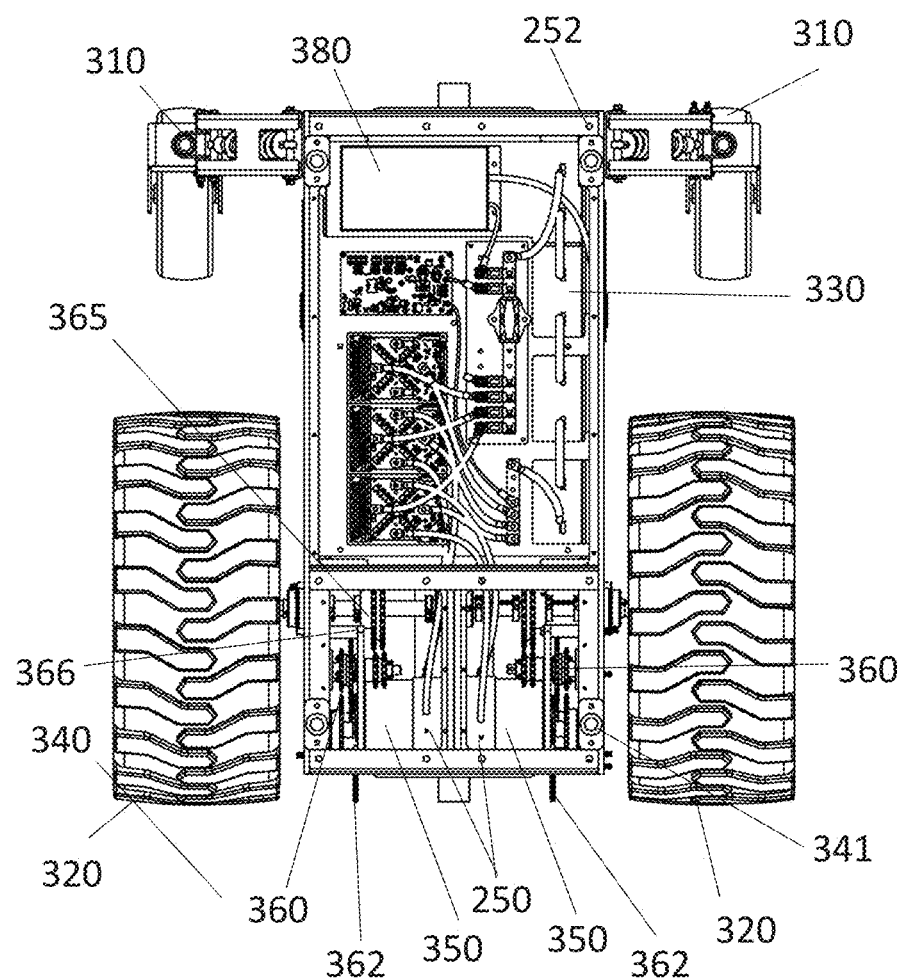
FIG. 3 is an elevated view of a first, completed embodiment of the LCR from the top looking down at the unit with no solar panel assembly installed.
Figure 4:
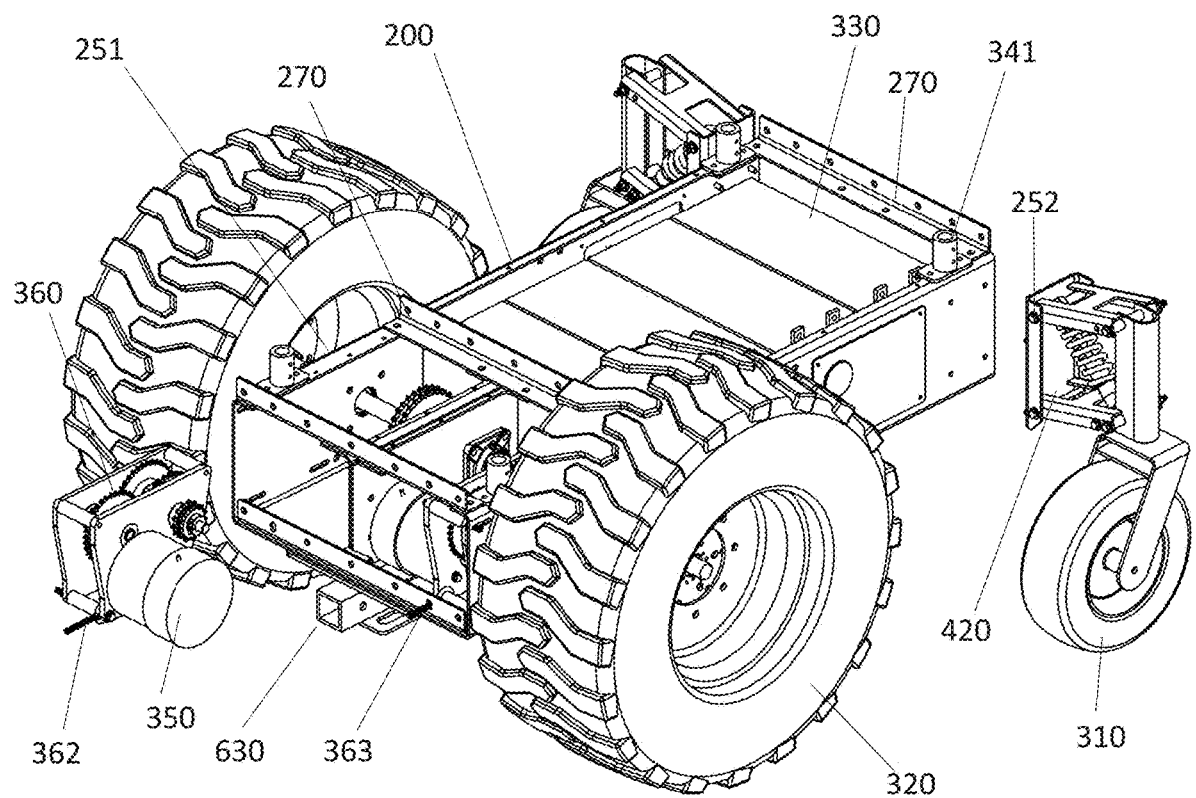
FIG. 4 is an elevated view of the first embodiment from the rear showing one of the electric components removed and showing the front right caster wheel removed and with no solar panel assembly installed.

In the most preferred embodiment the rechargeable battery 330, shown in FIGS. 1-3, is recharged from energy collected from at least one solar panel 340. The at least one solar panel 340 is mounted on the chassis 200 and to do this there is at least one solar panel mount 341. In some embodiments, these mounts 341 are placed and positioned at each corner of the chassis. The solar panel 340 can be connected directly to the solar panel mount 341. Alternatively, a solar panel connector 342 (e.g., a pole, strut channel) is used where the riser has a first end that is connected to the solar panel mount 341. The mounting pole 342 extends upwardly from the mount 341 and the solar panel 340 is then mounted to a second end of the mounting pole 342. This system elevates the solar panel 340 up and away from the chassis.

Next, as shown in FIGS. 3, 4, 6, 12, and 13, 42 the system needs to provide the collected power to the rotatable members 320. In a preferred embodiment the configurable frame chassis 200 further has at least one electric motor 350 affixable to the configurable frame body chassis 200, either directly to the frame body or with a mounting bracket of some sort, with the fasteners 252 at the mating cutouts 390 at the predetermined locations, at least one gearing mechanism 360 affixable to the configurable frame body chassis 200 with the fasteners 252 at the mating cutouts 390 at the predetermined locations, where the at least one gearing mechanism 360 is connectable to the at least one set of power-driven rotatable members 320, the power source drives the at least one electric motor 350, the at least one electric motor 350 turns the at least one gearing mechanism 360, and the gearing mechanism 360 transfers power to the at least one power-driven rotatable member 320. Here, the at least one electric motor 350 is affixed to the chassis body chassis 200 using the fasteners 252 and as above, it is envisioned that a single type fastener mechanism can be used to secure all parts to the chassis however, it is also possible that a limited number of substantially similar sized and type of fasteners be used. There are many ways to provide the power to the rotatable members but in a preferred embodiment power is transferred using at least one chain 361. The chain 361 can be metal, vinyl or some other material. It could also be a belt.

As described above, the present invention is a configurable frame body, that can be used for many different types of apparatus, but here it is envisioned to be used as a ground utility robot 100, having a uni-member bended frame chassis 200 having a first end 210, a second end 220 and a middle section 240 whereby the uni-member bended frame 200 is configured to easily connect and remove the following body parts: a first set of rotatable members 310 removably affixable at the first end; a second set of rotatable members 320 removably affixable at the second end; at least one battery 330; at least one solar panel 340; at least one electric motor 350; at least one gearing mechanism 360 that is connectable to the at least one electric motor 350 and to at least one of the first and the second set of rotatable members 310, 320; at least one sensor 370; and at least one computer system 380. This is an extremely simple, yet beautiful and economical design created so that the land care robot, or LCR 100, can be assembled quickly, efficiently, economically, and with a variety of off the shelf parts.

This invention is also focused on the method of putting the parts together. FIGS. 1-12 are views of the uni-member bended frame chassis 200. In these Figs. the frame is shown after bending. This is a very economical and efficient way to create a simple yet versatile frame for the LCR 100.

Generally, the present invention is a method of creating a configurable, uni-member, U-shaped bended, frame chassis 200 and assembling a ground utility robot or land care robot (LCR) 100 using parts that can be removeably affixed by taking the steps of having a single sheet of material, forming holes 390 at predetermined locations in the single sheet of material, using the single sheet of material, to form a base 290, a first side 291, a second side 292, a first top plate 251 and a second top plate 251 by, configuring the single sheet of material to create the base 290, bending the material lengthwise and upwardly from the base 290 and forming the first side 291, bending the material lengthwise and upwardly from the base 290 and forming the second side 292, bending the material lengthwise at a top of the first side and forming the first top plate 251, and bending the material lengthwise at a top of the second side 292 and forming the second top plate 292, that is typically a mirror image of the first top plate 291, affixing at least one cross-body member 270 in at least one location with fasteners 252 to the first side 291 and the second side 292 at the holes 390 at the predetermined locations, and using the fasteners 252 and the holes 390 at the predetermined locations for adding, removing or replacing the parts.

More specifically, the chassis above is created as follows. The frame starts with a 4×8 foot sheet of metal. Next, the metal is cut with a laser, punch, water jet or other means, to create the variety of holes in the frame. These frame holes 390 are positioned at desired locations in the frame and are used for different purposes (e.g., attaching all other apparatus and body parts to the frame 200). After the holes 390 are cut into the metal, the metal is bent in two or more locations to create the substantially U-shaped frame 200, as seen in FIGS. 11-12. As is seen, the chassis has a flat base with the sides bended upwardly from the flat base. In the preferred embodiment, the single metal sheet is bent to create the frame and the frame is bent in the U-shape creating the base 290 and sides 291, 292 at approximately 90-degrees to each other and then is bent 90-degrees at the top of each of the side walls to create a small top shelf 251 or top plate. These angles are not fixed at 90 degrees and can be altered, either greater than or less than 90 degrees, depending on the design desired.

After the initial frame is cut and bent the side walls 251 are secured one to another, for example, using at least one reinforcement member, or cross-body connecting member 270. This member is typically an L shaped member but is not limited by this shape. It could be uni-strut, or any other type of bracket as long as it provides stability to the chassis. and these brackets, or cross-body connecting members 270 are secured at the tops of the side walls 291, 292 to provide stability to the walls and thus the entire chassis 200. They also provide additional attachment points for other body parts.

The next steps, as shown in FIG. 42, involve adding the body parts, specifically, affixing rotatable member mounts 420 at a first end 210 of the first side 291 and a first end 210 of the second side 292, affixing the rotatable member mounts 420 at a second end 220 of the first side 291 and a second end 220 of the second side 292, affixing rotatable members 310, 320 to the rotatable member mounts 420, affixing at least one power supply 320 to the frame, affixing at least one electric motor 350 to the frame 200, affixing at least one gearing mechanism 360 to the frame 200, using the fasteners 252 to affix the parts to the bended frame chassis 200 at the holes at the predetermined locations, connecting the at least one power supply 320 to the at least one electric motor 350, connecting the at least one electric motor 350 to the at least one gearing mechanism 360, connecting the at least one gearing mechanism 360 to the at least one of the rotatable members 320, and powering the at least one of the rotatable member 320.

Figure 27:
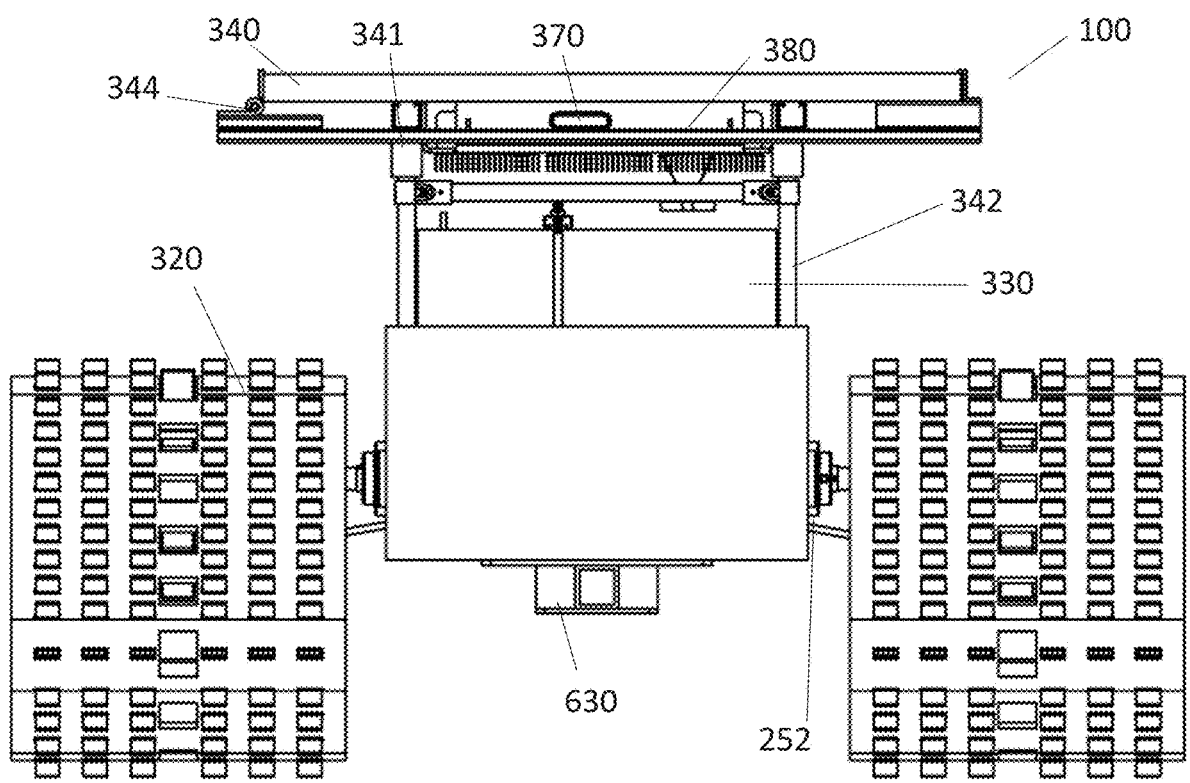
FIG. 27 is a rear view of the LCR with tracks used as one set of rotatable members.
Figure 28:
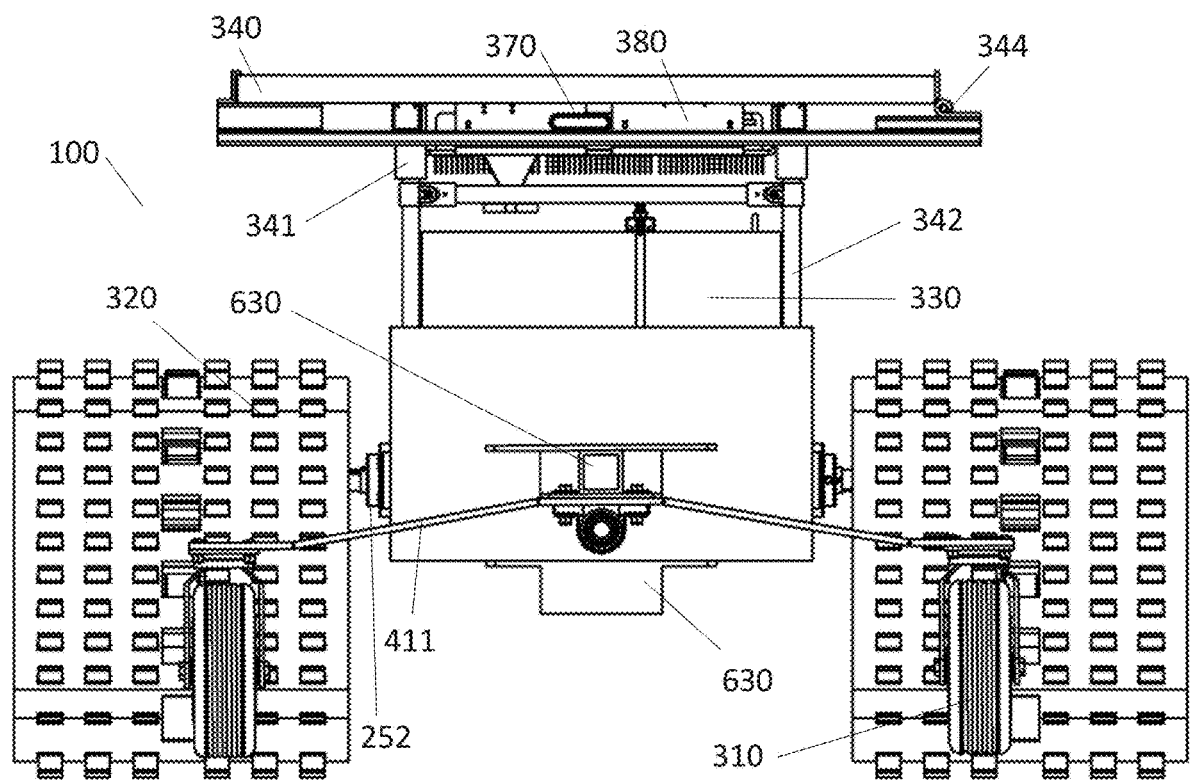
FIG. 28 is a front view of the LCR with tracks used as the first set of rotatable members and the seesaw front caster configuration as the second set of rotatable members.
Figure 29:
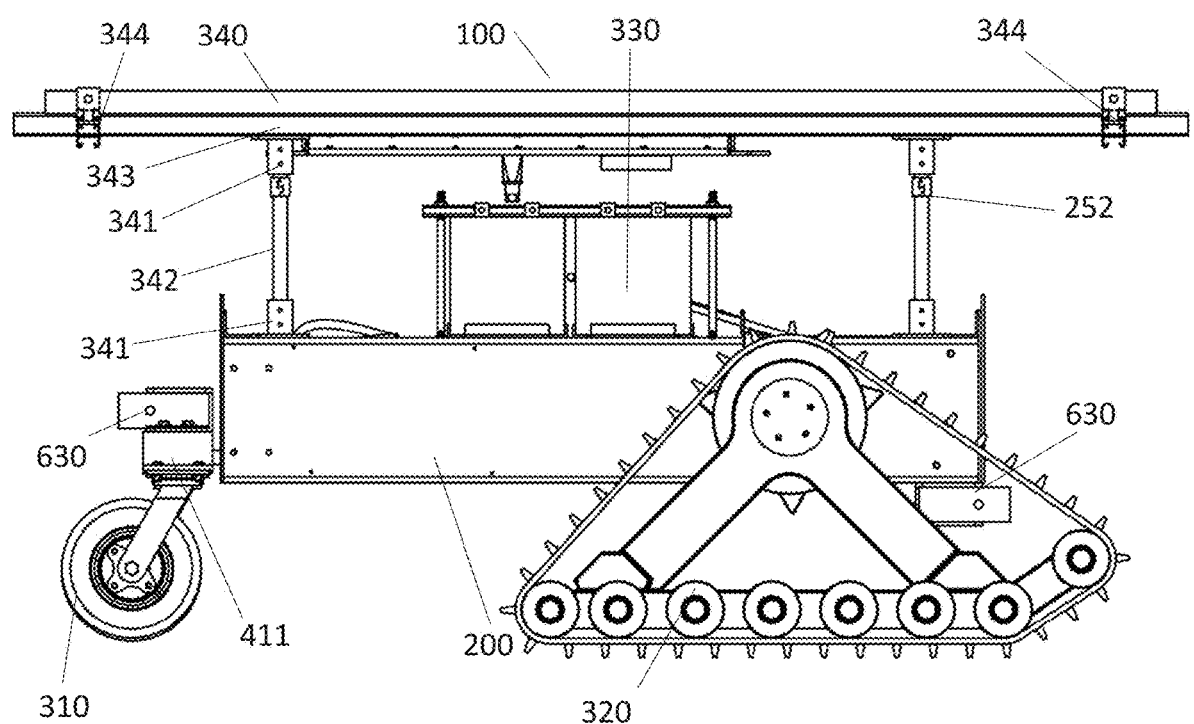
FIG. 29 is a side view of the LCR with tracks used as the first set of rotatable members and the front seesaw casters as the second set of rotatable members.

The rotatable members can be any of a variety of rotatable members and are easily interchangeable and replaceable. For example, they can be solid rubber wheels, inflated wheels, studded wheels, aerating wheels with members or spikes for ground aeration, balloon wheels, large diameter or small diameter wheels or any other type of imaginable rotatable members. For example, they can be tracks such as those used on snowmobiles or on CATS and as shown in FIGS. 27 to 29. These rotatable members are attached to the frame 200 using simple connection parts and the simple mounting mechanisms for the rotatable members.

In FIG. 1 and FIG. 42 the LCR 100 has a pair of large diameter rear wheels attached to the first end 210 of the frame 200. In certain embodiments, these two or more wheels are attached to each side and at the first end. In one embodiment an axle 412 is used to secure the wheels to the LCR. To change from two rear wheels to four or more rear wheels, the axle 412 is removed and a longer axle inserted to accommodate the additional wheels. Likewise, to have two wheels rather than four or more wheels, the longer axle is replaced with the shorter axle. Replacing the axle 412 itself is a simple process and can be done in the field. The axle diameter and strength is designed and configured for use with four or more wheels and the same axle diameter is used for both the two-wheeled version and the four-or-more wheeled version to minimize the complexity of the LCR. It is entirely possible for the LCR 100 to have large diameter wheels on both the first end 210 and the second end 220, but in the shown embodiment the front end 210 first set of rotatable members 310 are caster wheels 410, as can be seen in FIGS. 1, 2, 3, 4, 5, 6, 15, 18 and 19.

Figure 23:
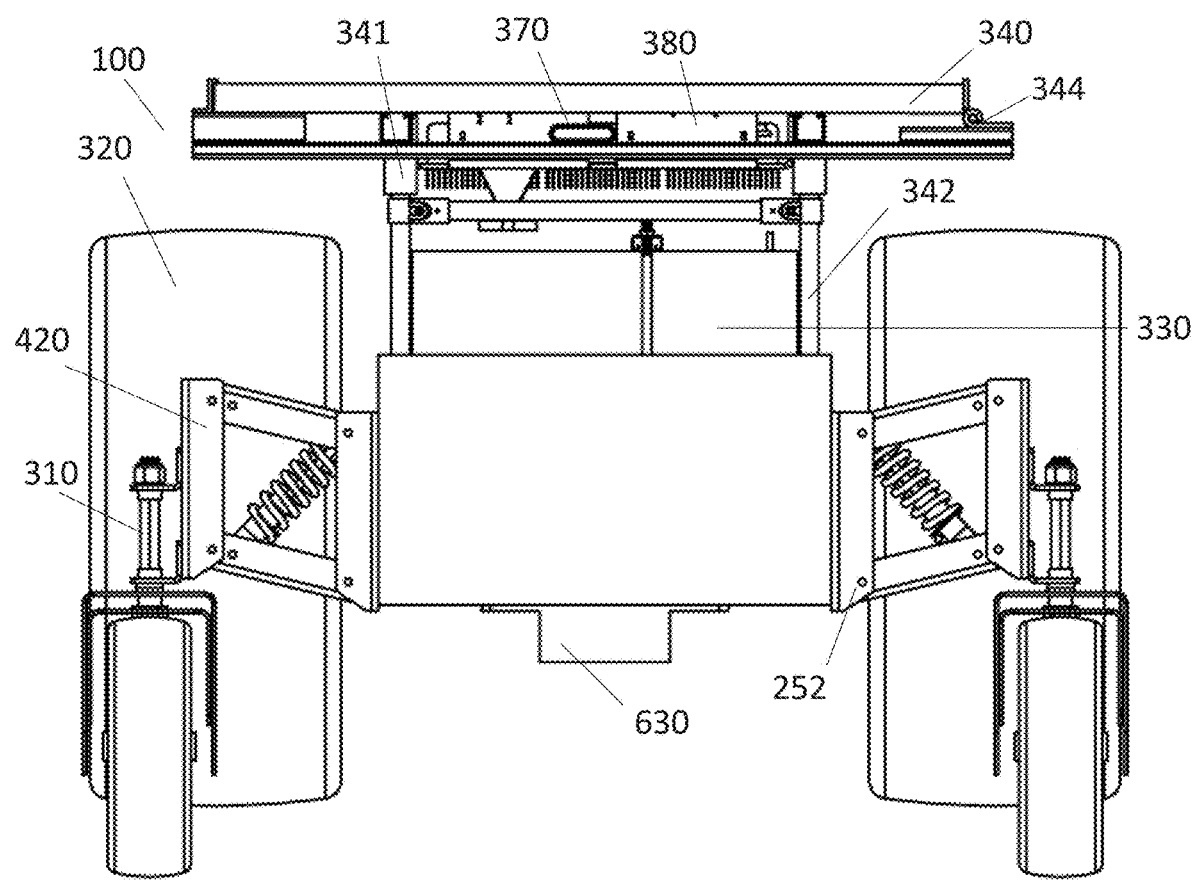
FIG. 23 is a front view of the LCR showing the side mounted caster assemblies.

In a first configuration, the casters 410 are affixed to the mounting members 400 that can have a built in suspension system 420. FIG. 23 is a view from the front showing how the casters look when mounted to the chassis using the side mounted rotatable member mounting member brackets. The mounting member 400 itself is extremely simple and is affixable to the frame 200 using a limited number of fasteners 252, that can be bolts, inserted through the frame holes 390. Because the wheels and casters are identical it doesn't matter if the mounting member 400 is affixed to the right side or left side of the frame 200. Again, the parts are high strength and are easily replaced, or repaired in the field.

Another configuration useable with the present disclosure relates to an assembly for caster wheels 410 on each side of the LCR and that allows pivoting at a midpoint between the casters 410, perpendicular to their alignment with the robot or vehicle. Included are two variations, one which mounts directly to the chassis of the LCR or vehicle, the other which is mounted to a hitch via a hitch adapter. These two configurations are the basis for Caster SeeSaws as shown in FIGS. 15-36, and 43-44.

Aspects of the Caster SeeSaw are presented for use on a robot or LCR or other vehicle in various locations for the purpose of maintaining traction on uneven surfaces. This SeeSaw embodiment is shown in an exploded view at FIG. 43. Rotation about a central axis 414 allows for each caster 410 to maintain full contact with the ground surface while the robot or vehicle navigates the environment. The casters 410 are mounted at opposite ends of a caster beam 411. The casters 410 in this embodiment are passive wheels, they are not driven or powered by the machine in any way.

Figure 15:
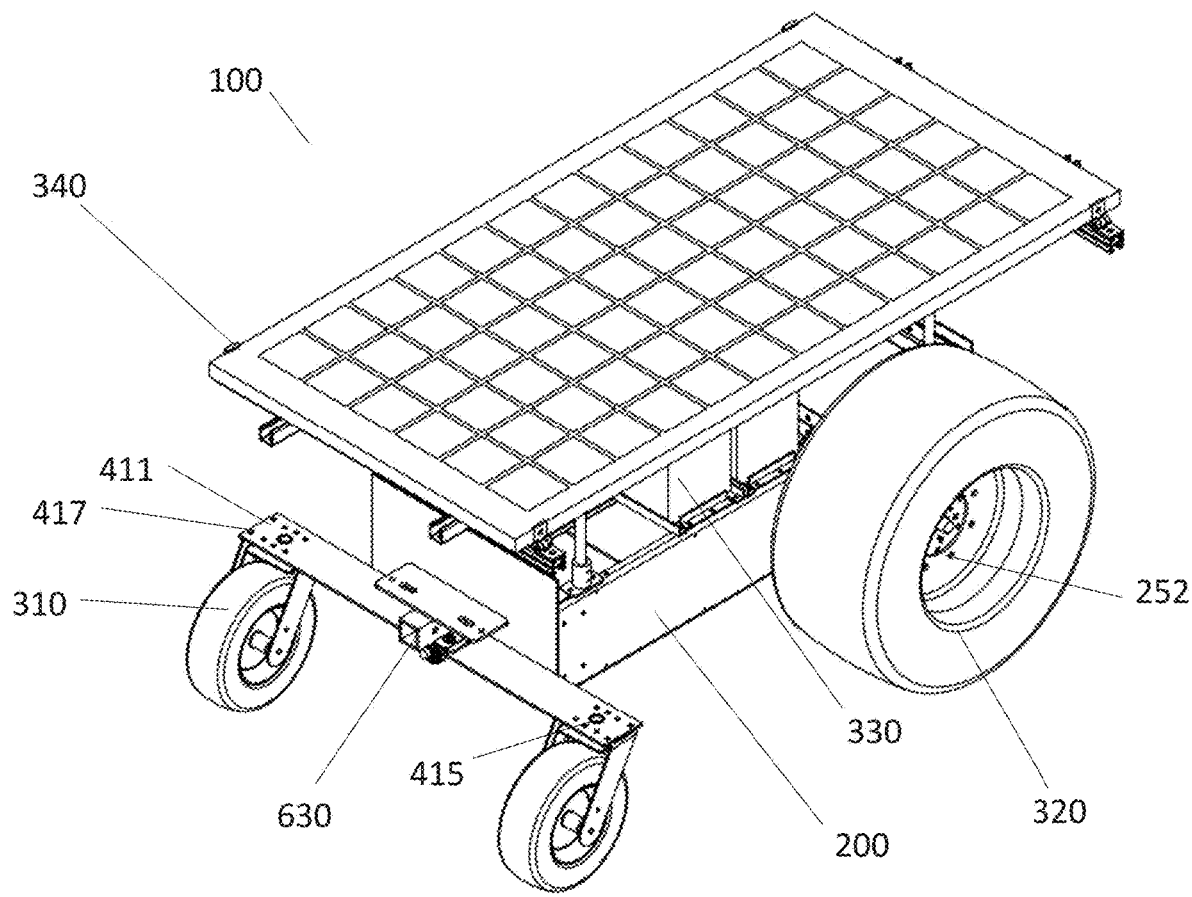
FIG. 15 is an elevated view from the front of the LCR with a seesaw caster assembly.

FIGS. 15-36 and 43 show a variety of Caster SeeSaw embodiments. FIG. 15 specifically shows an elevated perspective view of the chassis mounted Caster Seesaw and FIG. 43 is an exploded view that clearly shows all the parts of this embodiment. A second embodiment is generally the same configuration as the chassis mounted but uses a different apparatus to connect to the chassis, as can be seen in FIG. 22. Reference is now made to FIG. 43. This first embodiment has a caster beam 411, or mounting member on which the Caster Seesaw is built, having a top, a bottom, a first end and a second end. Casters 410 are mounted on the bottom of the caster beam 411 using mounting holes 415 where fasteners are used to connect the casters to the mounting member 411 at the first end and the second end. A hitch 630, in this case a receiver for a standard shank/receiver type hitch, is mounted at a midpoint on the top of the caster beam 411 and is designed to allow accessories connectability to the front of the LCR. An axle 414 is inserted into and mounted to at least one, and ideally two or more bearing brackets 416 at the bottom of the caster beam 411. Bearings are inside the bearing brackets 416 and allow for the seesaw to easily pivot about axel 414. The axel 414 is mounted within and secured to the bearing and bearing brackets 416 with shaft collars 641 that are at the front and back of the axel 414. The rear of the axel 414 is attached to the LCR using at least one more bearing bracket 416 and the other shaft collar 641 to secure the entire part set together.

Figure 35:
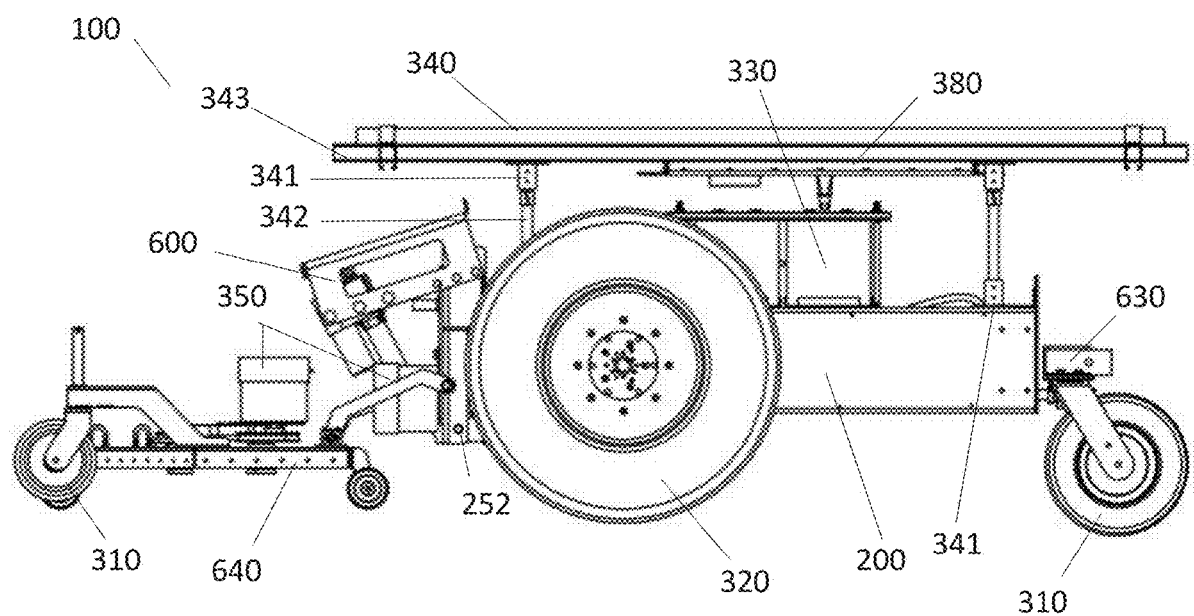
FIG. 35 is a side view of the LCR with mowing accessory attached.
Figure 36:
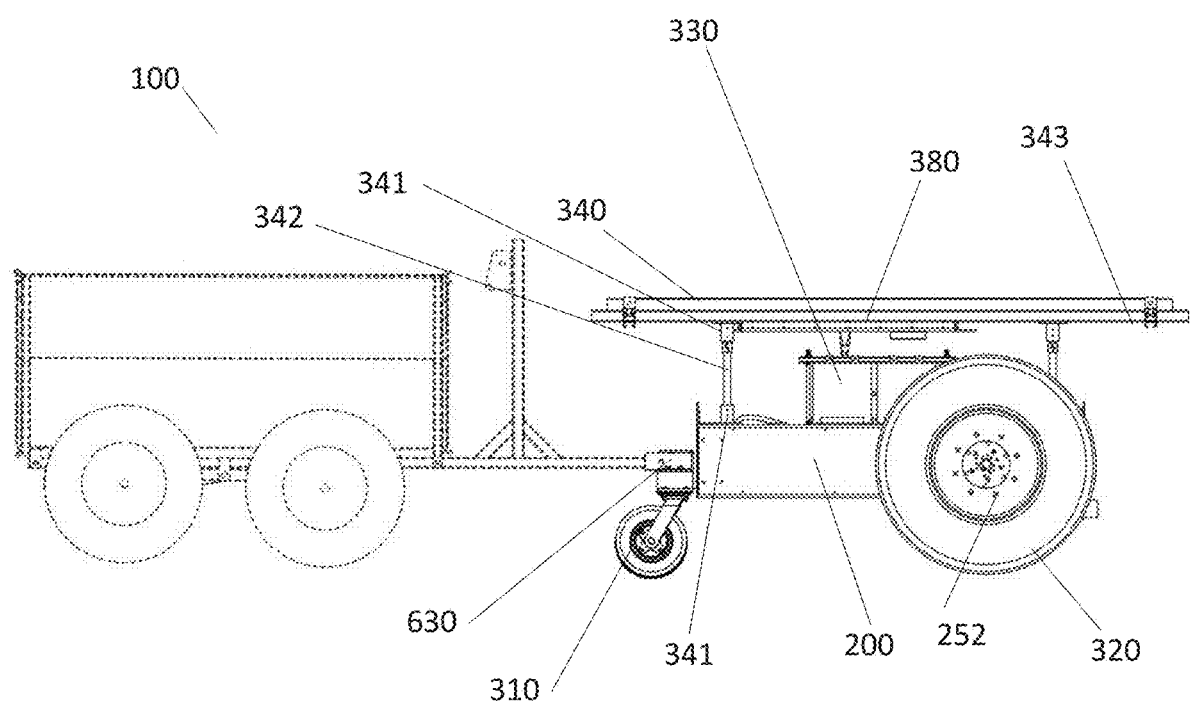
FIG. 36 is a side view of the LCR with a wagon attached to the front of the LCR.

The exploded view in FIG. 43 allows for clarity of the components involved with the chassis-mounted configuration. The hitch-mounted configuration shows the axle 412, mounted to a vertical hitch adapter, as shown in FIGS. 22 and 35. As above, the caster beam 400 on which all components are mounted, has mounting holes or cutouts 415 for the bearings mounting member 400, a hitch, and for either the flat-plate casters or the stem casters 410.

The receiver hitch provides a way to attach a variety of implements to be towed by the robot or vehicle. The two plate-mounted bearings 416 allow the bearing assembly to rotate about the axle 412. The axle 412, on which the assembly rotates, is mounted either directly to the robot or vehicle chassis 200 or to a hitch adapter. The two casters 410 used in the assembly can be mounted to the bottom of the caster beam 411 or they can be the stem type mounting member that use the holes 415 in the mounting member caster beam 411 to secure them to the caster beam 411. Mounted at each end of the caster beam 411, the casters 410 allow for two points of contact with the surface and passively move with the robot or vehicle. The shaft collar 641 is used to maintain the position of the caster beam 411 and all other components in relation to the axle 412.

Figure 16:
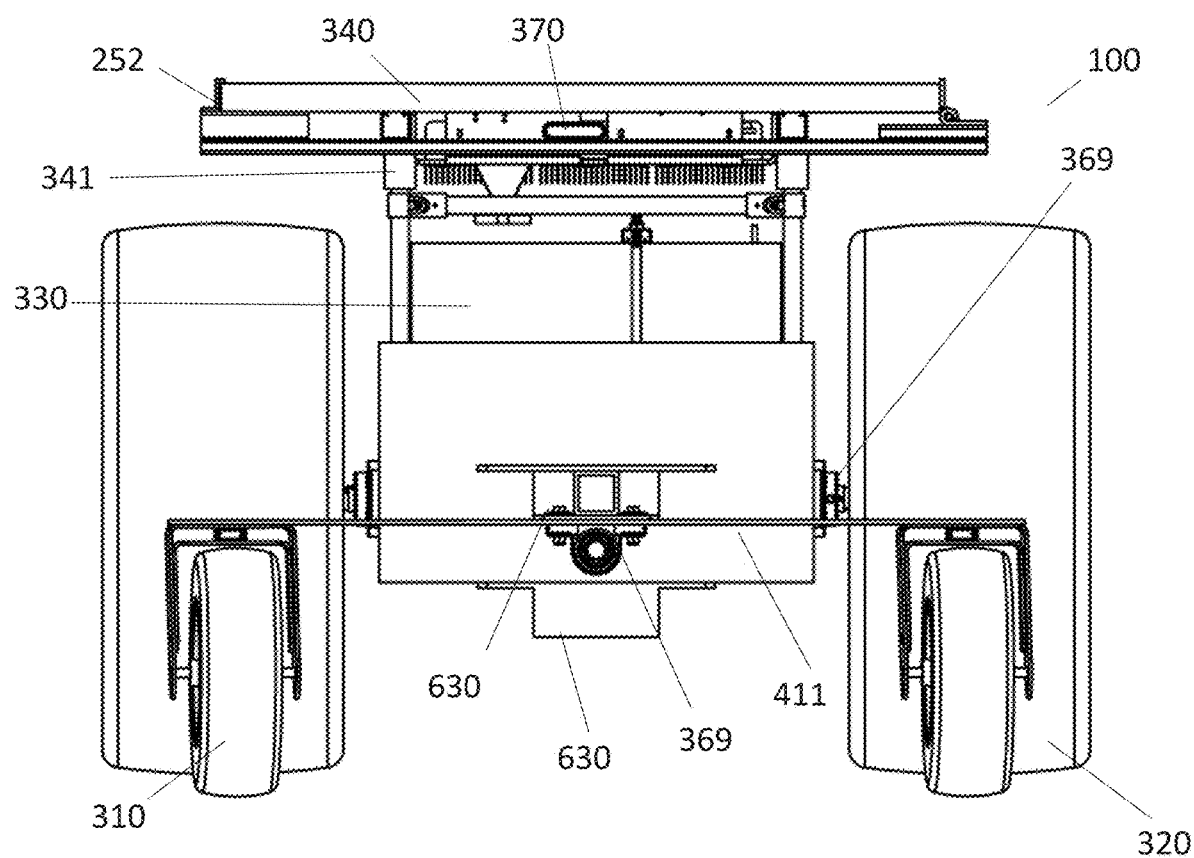
FIG. 16 is view from the front of the LCR with the seesaw caster assembly.

The following figures show different aspects of this unique SeeSaw Caster configuration. FIG. 16 is a view from the front of the LCR looking into the axel 412, showing the hitch attachment mechanism and the casters 410.

Figure 17:
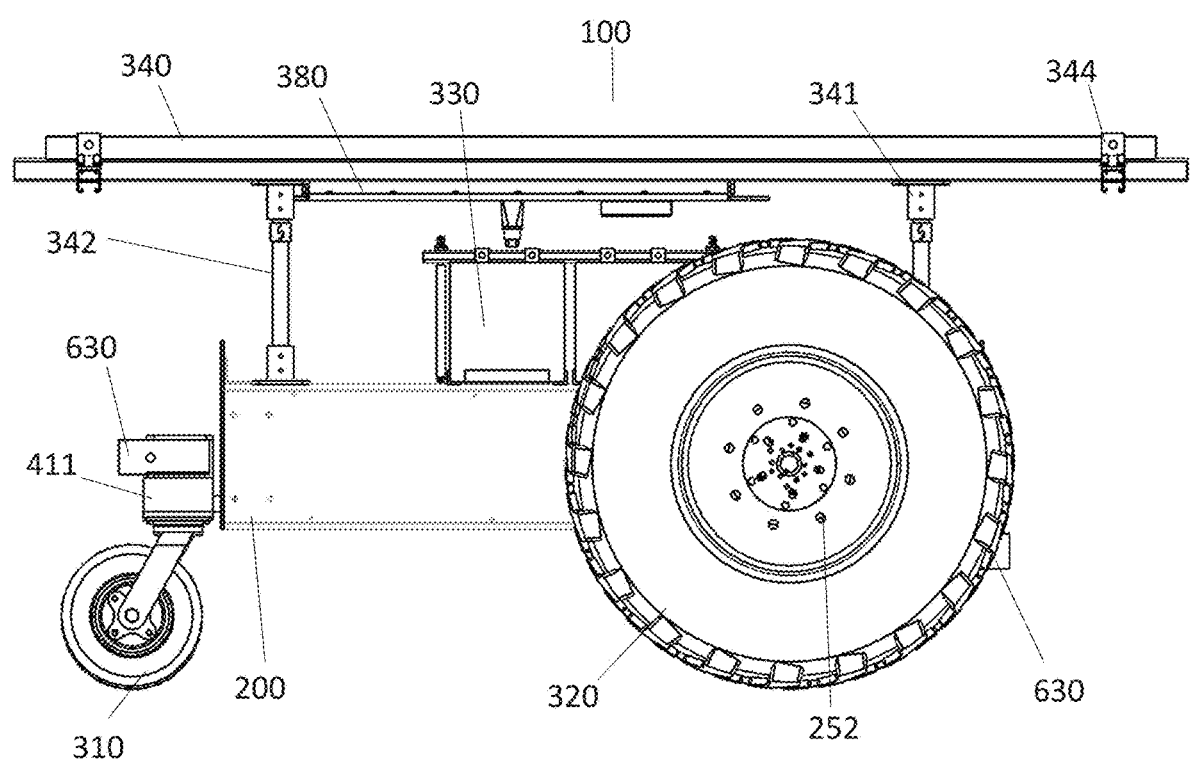
FIG. 17 is a side view of the LCR with the seesaw caster assembly.

FIG. 17 is a side view of the chassis-mounted Caster Seesaw. On the left between the caster and mounting plate is the axle which is inserted into the bearings mounted in the chassis of the robot or vehicle.

Figure 18:
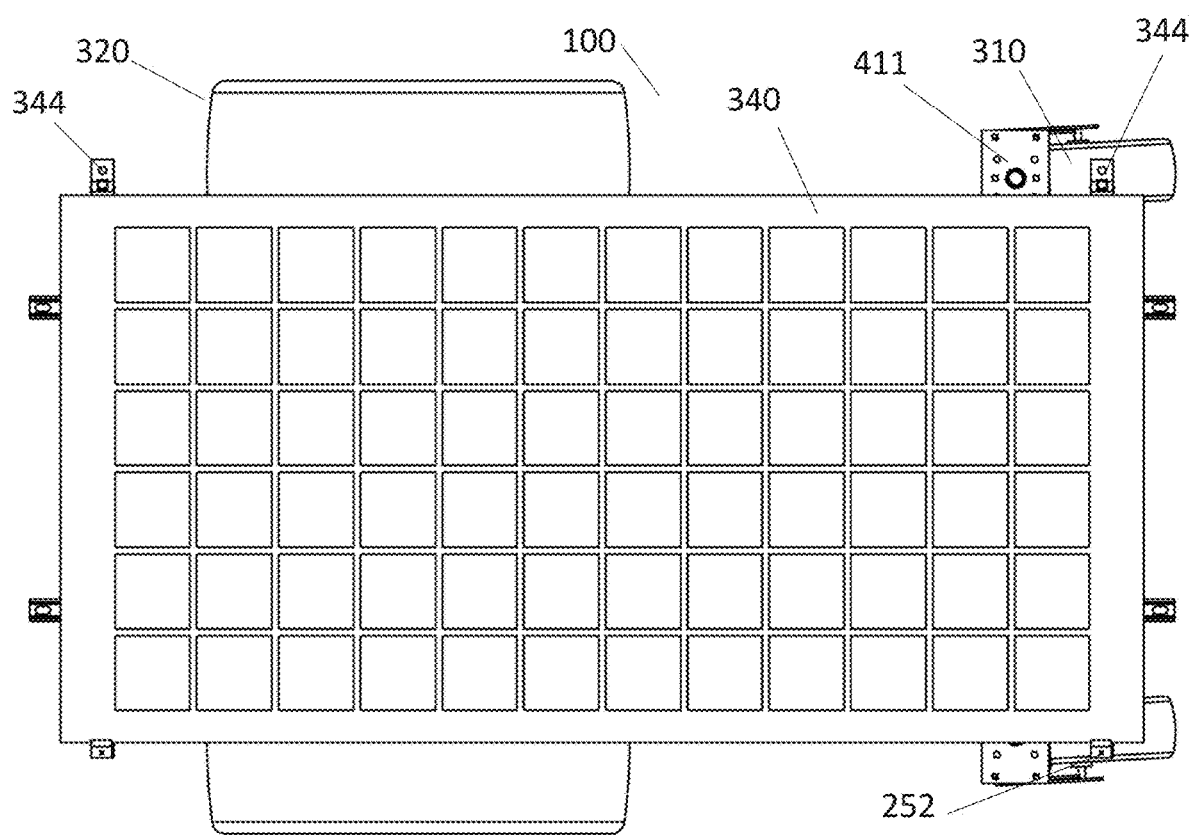
FIG. 18 is a top view of the LCR looking down at the solar panel when in place.

FIG. 18 is a top view of the chassis-mounted Caster Seesaw. Visible are the hole patterns, or caster beam cutouts 417 in the caster beam 411 that allow for the attachment of either the flat-plate casters or stem casters.

Figure 19:
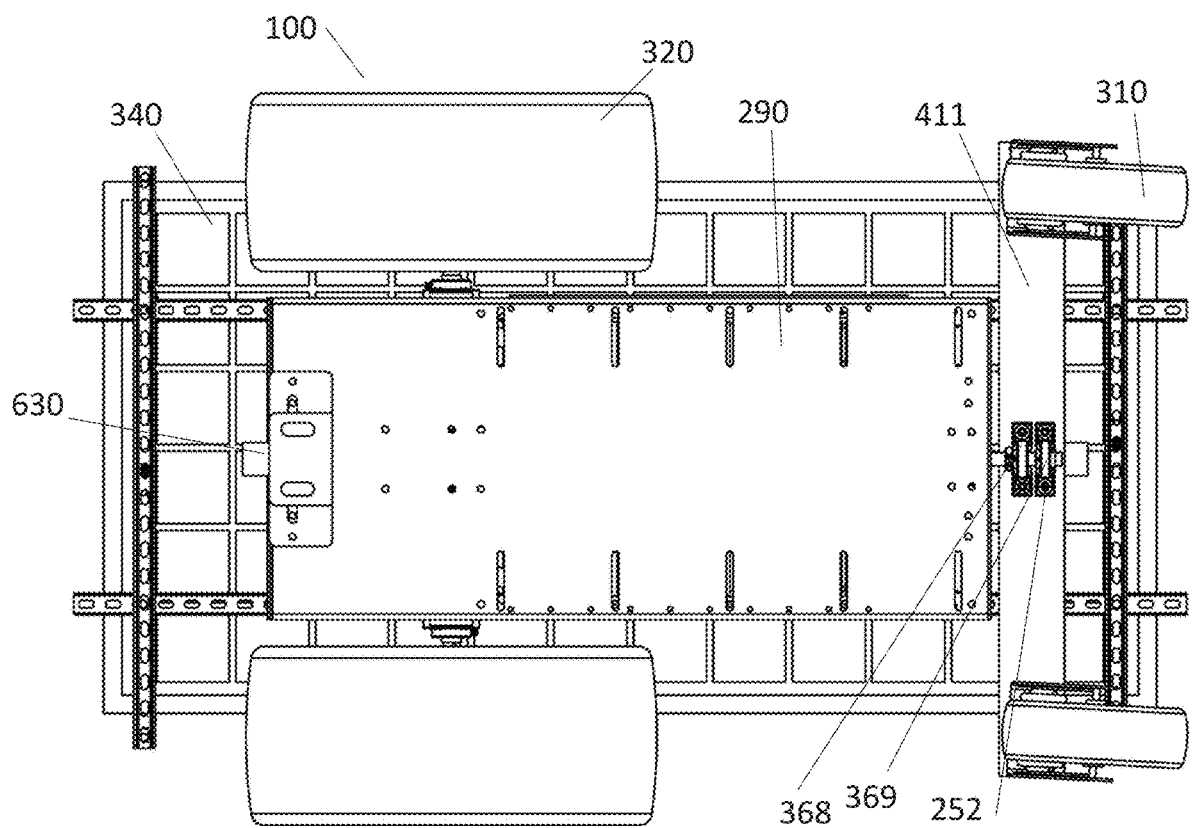
FIG. 19 is a view from the bottom of the LCR looking up at the chassis, solar panel framing, wheels and seesaw caster assembly.

FIG. 19 is an opposite view showing the chassis-mounted caster seesaw from the bottom.

Figure 20:
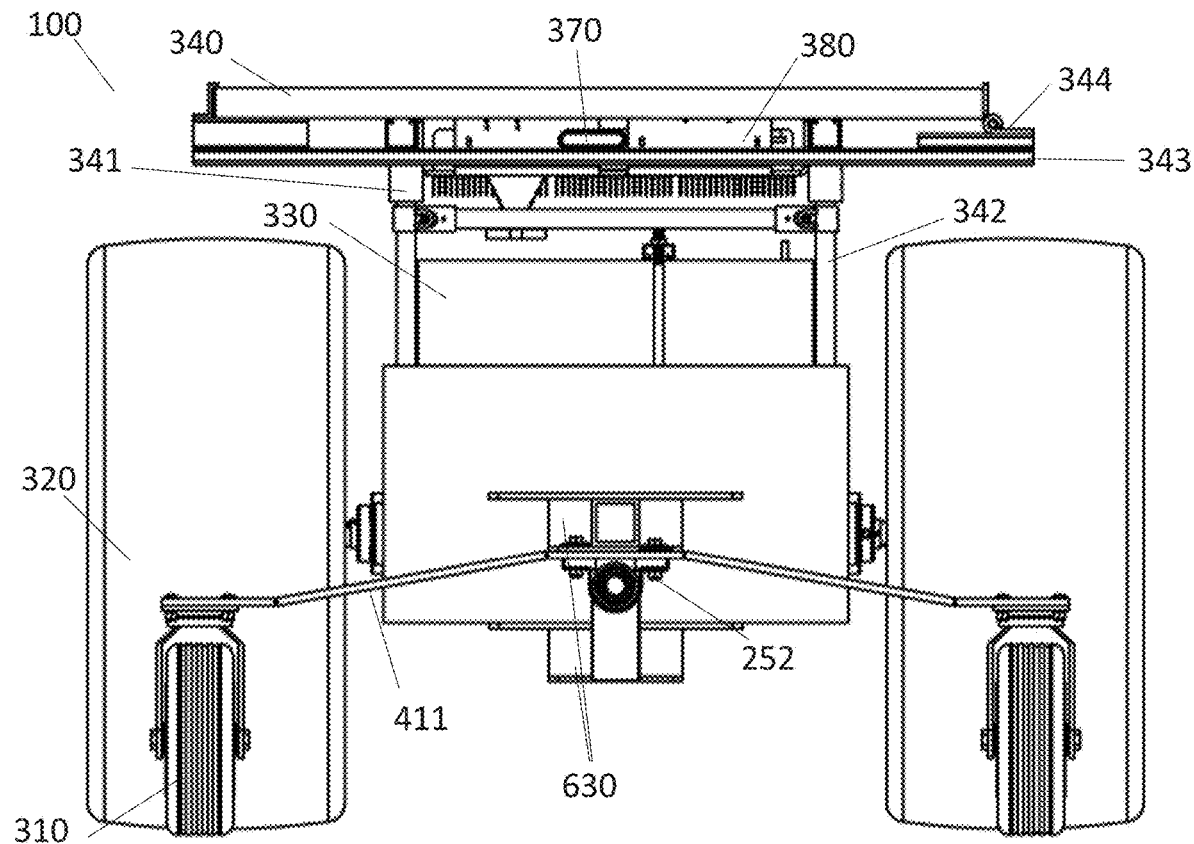
FIG. 20 is a front view of the LCR with the seesaw caster assembly in place.

FIG. 20 is another front view of the caster mounted beam configuration.

Figure 21:
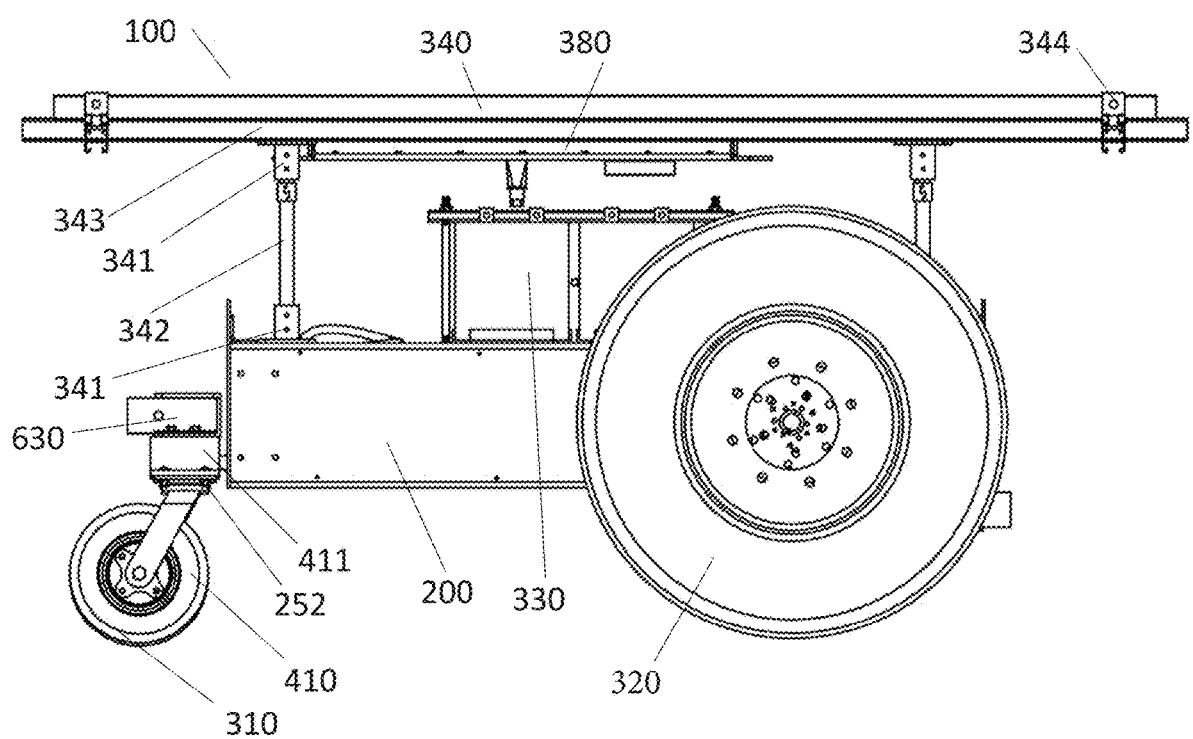
FIG. 21 is another side view of the LCR with different driven wheels attached.
Figure 22:
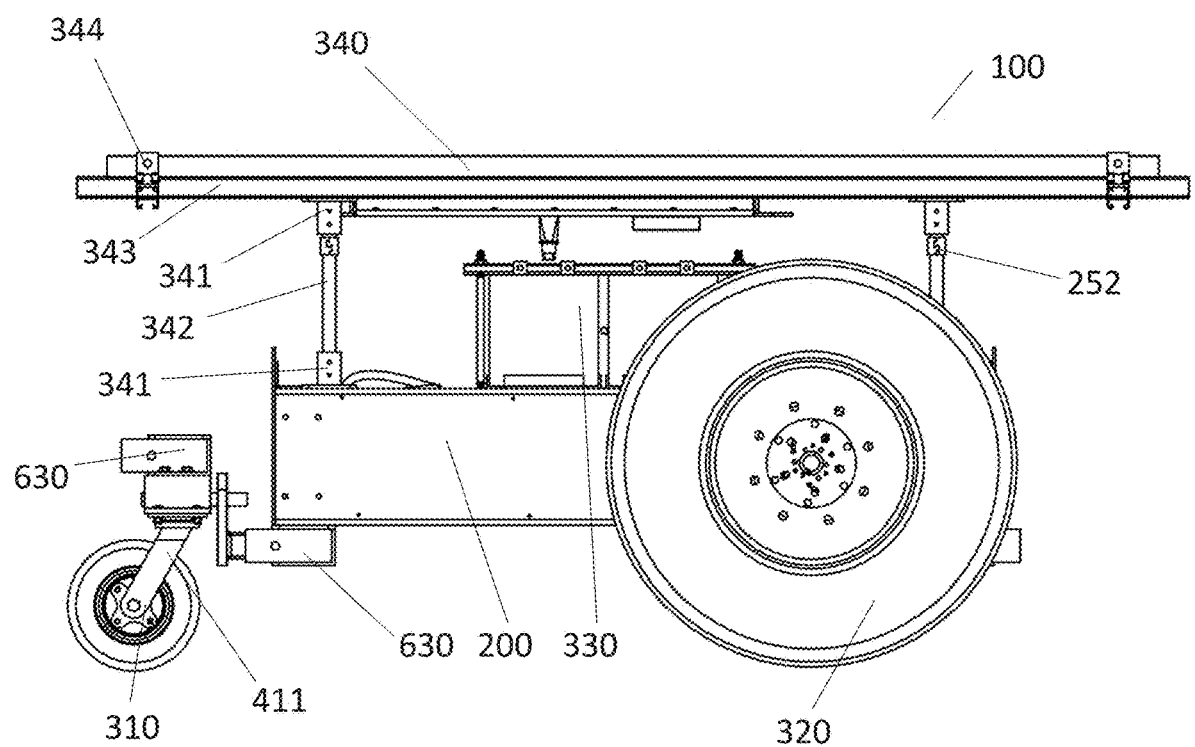
FIG. 22 is another side view of the LCR with a second embodiment mounting system for the seesaw caster assembly.
Figure 24:
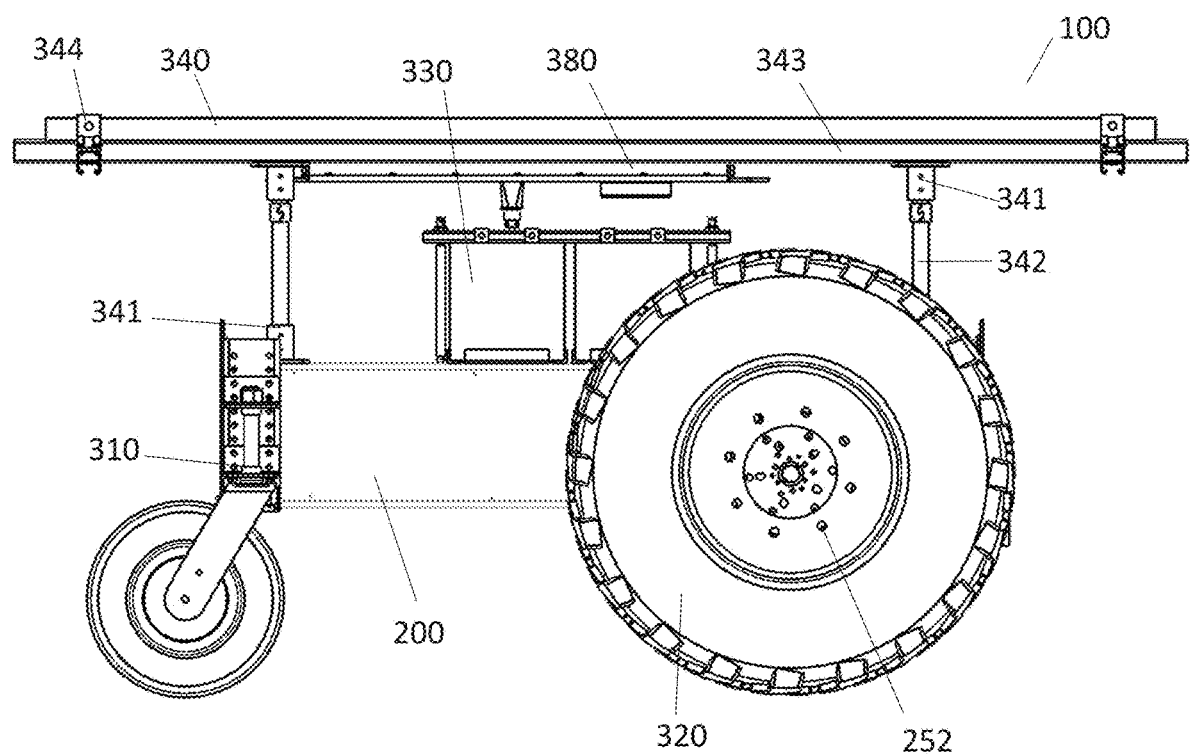
FIG. 24 is a side view of the LCR with the side mounted caster assemblies.

FIG. 21 is another side view of the hitch-mounted caster seesaw. To the left, and mounted to the axle, is axel that is inserted into the seesaw bearing bracket 415 and then to the frame of the robot or vehicle FIG. 22 is another side view of the hitch-mounted caster seesaw. To the left, and mounted to the axle, is the vertical hitch adapter that is inserted into the hitch mounted to the frame of the robot or vehicle FIG. 24 is a side view of the chassis-mounted Caster Seesaw implemented as an attachment to the LCR.

Figure 25:
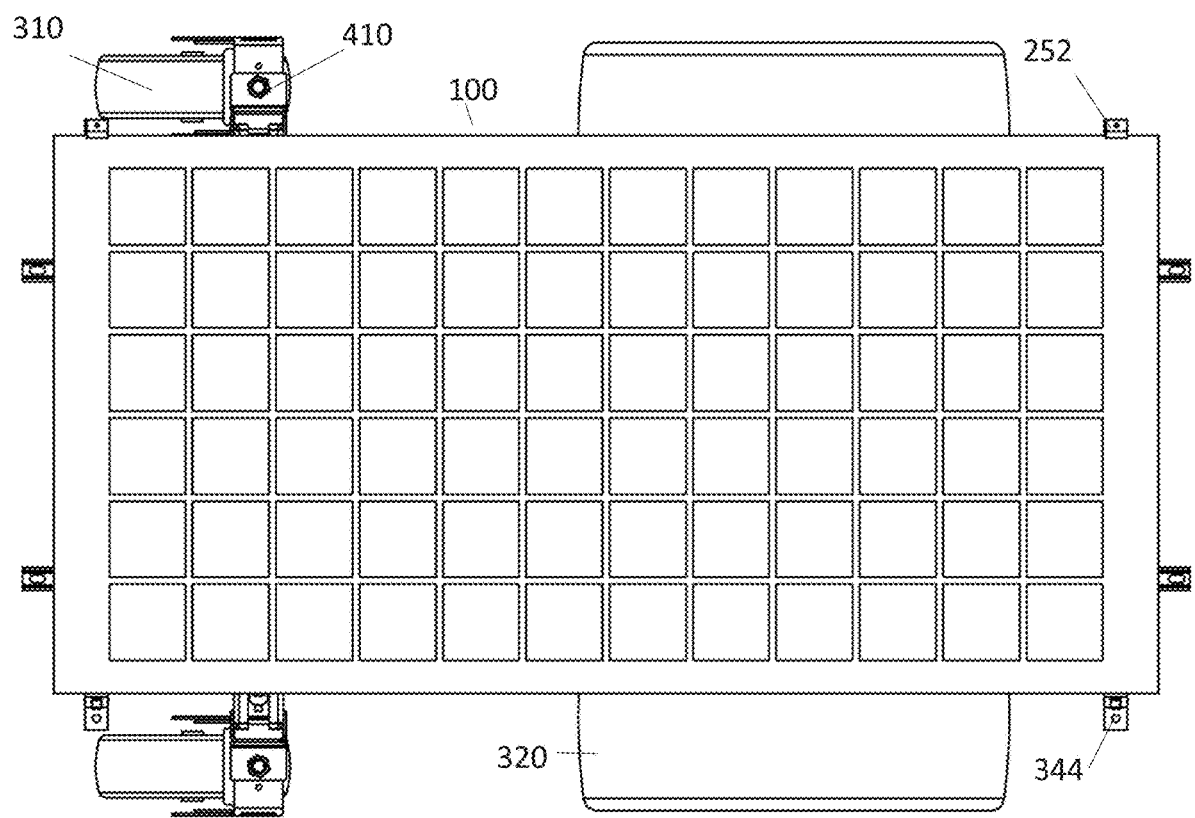
FIG. 25 is a top view of the LCR with the side mounted caster assemblies and solar panel.

FIG. 25 is a top view of the hitch-mounted Caster Seesaw implemented as an attachment to the LCR looking down from above and clearly showing the solar panels.

Figure 26:
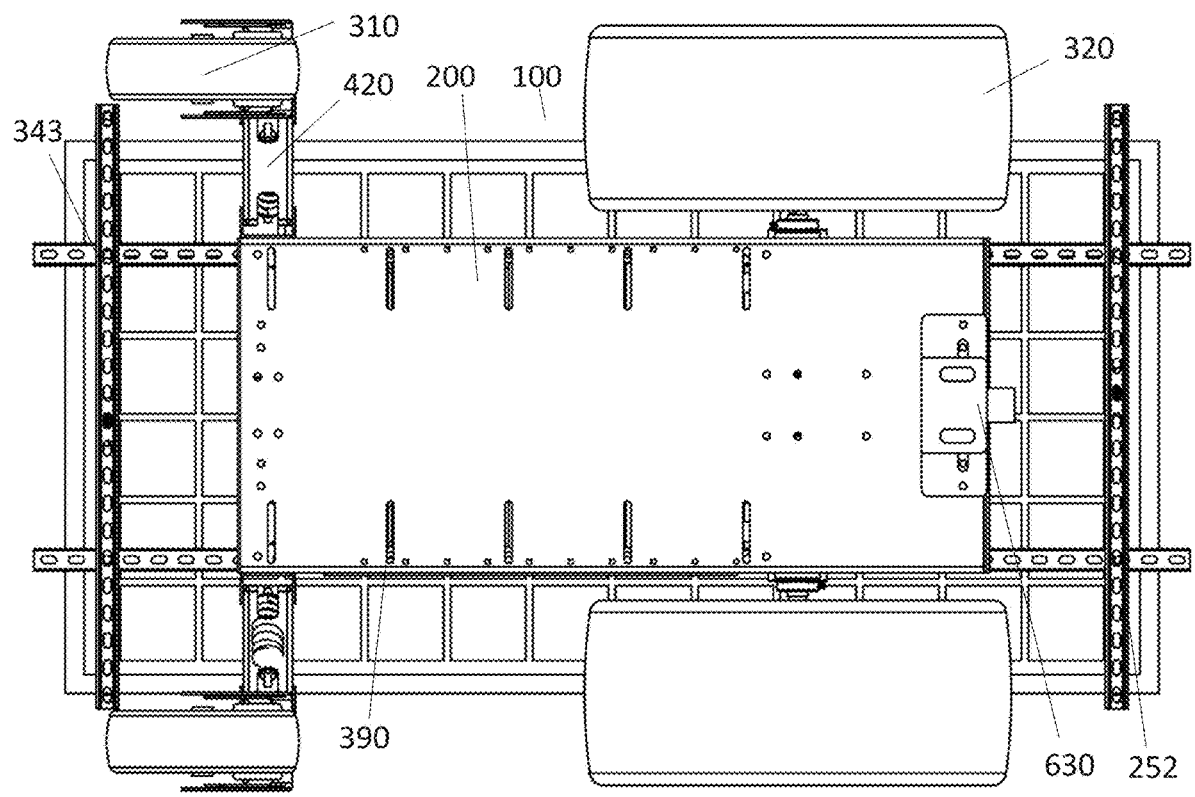
FIG. 26 is a bottom view of the LCR with the side mounted caster assemblies.

FIG. 26 is view of the chassis-mounted Caster Seesaw implemented as an attachment to the LCR. possible robot from the bottom looking up.

FIGS. 27-29 are views of the LCR from above when it has the caster seesaw design for the front rotatable members and tracks utilized as the rotatable members at the rear.

Figure 30:
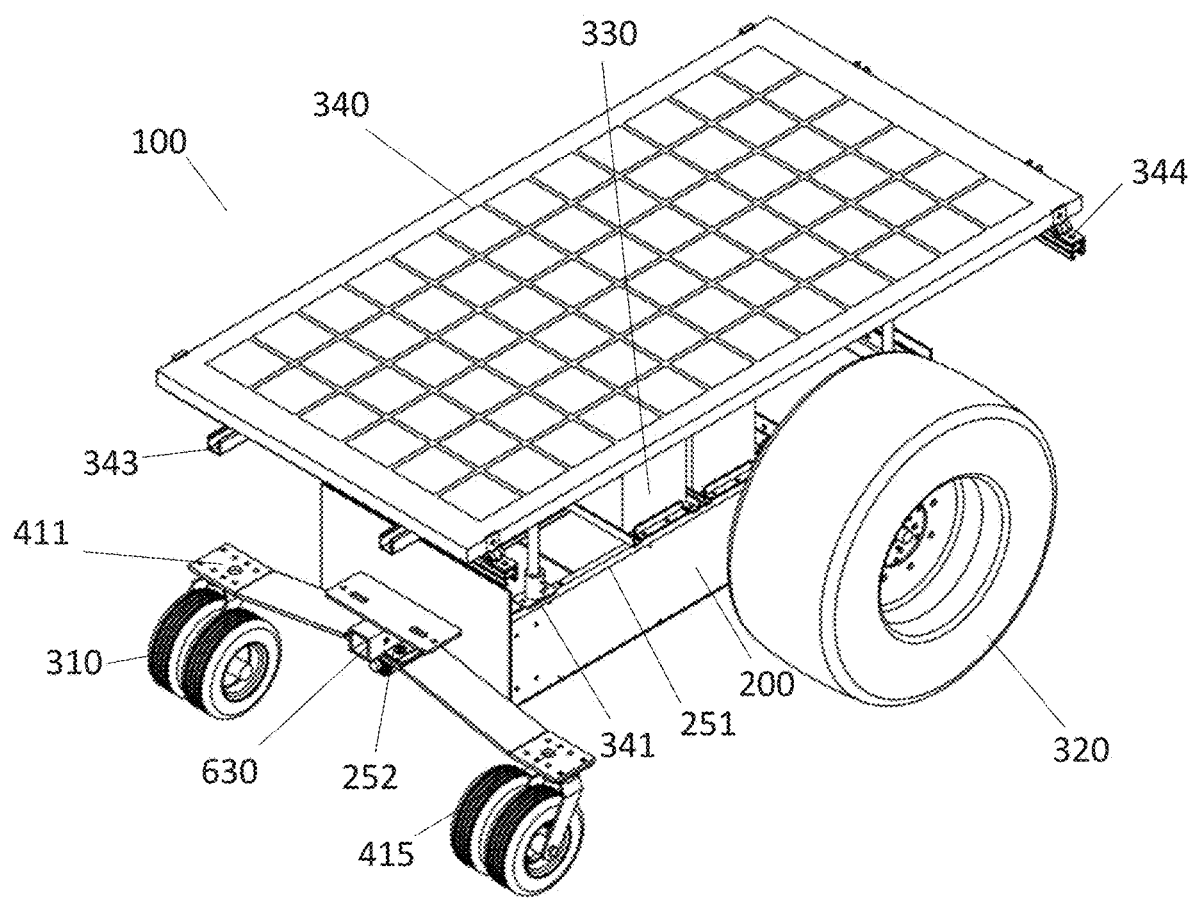
FIG. 30 is an elevated perspective view of the LCR with large wheels used as the first set of rotatable members and a pair of double wheels and seesaw caster configuration as the second set of rotatable members.
Figure 31:
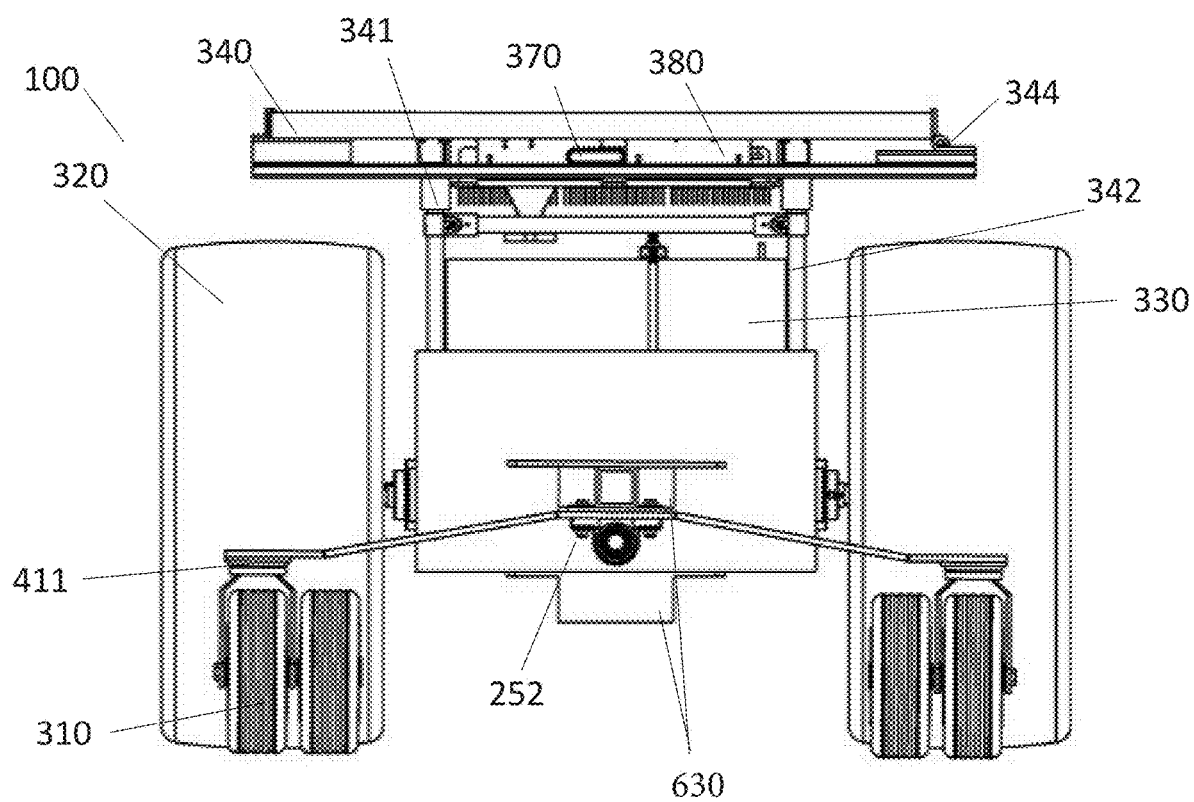
FIG. 31 is a front view of the LCR with large wheels used as the rear set of rotatable members and the front double wheels with the seesaw caster as the front set of rotatable members.

The seesaw caster assembly is also not confined to one configuration, as can be seen in FIGS. 30-31. Here is the seesaw assembly having two wheels as the passive rotatable members 310 at each side of the seesaw beam 411.

Figure 32:
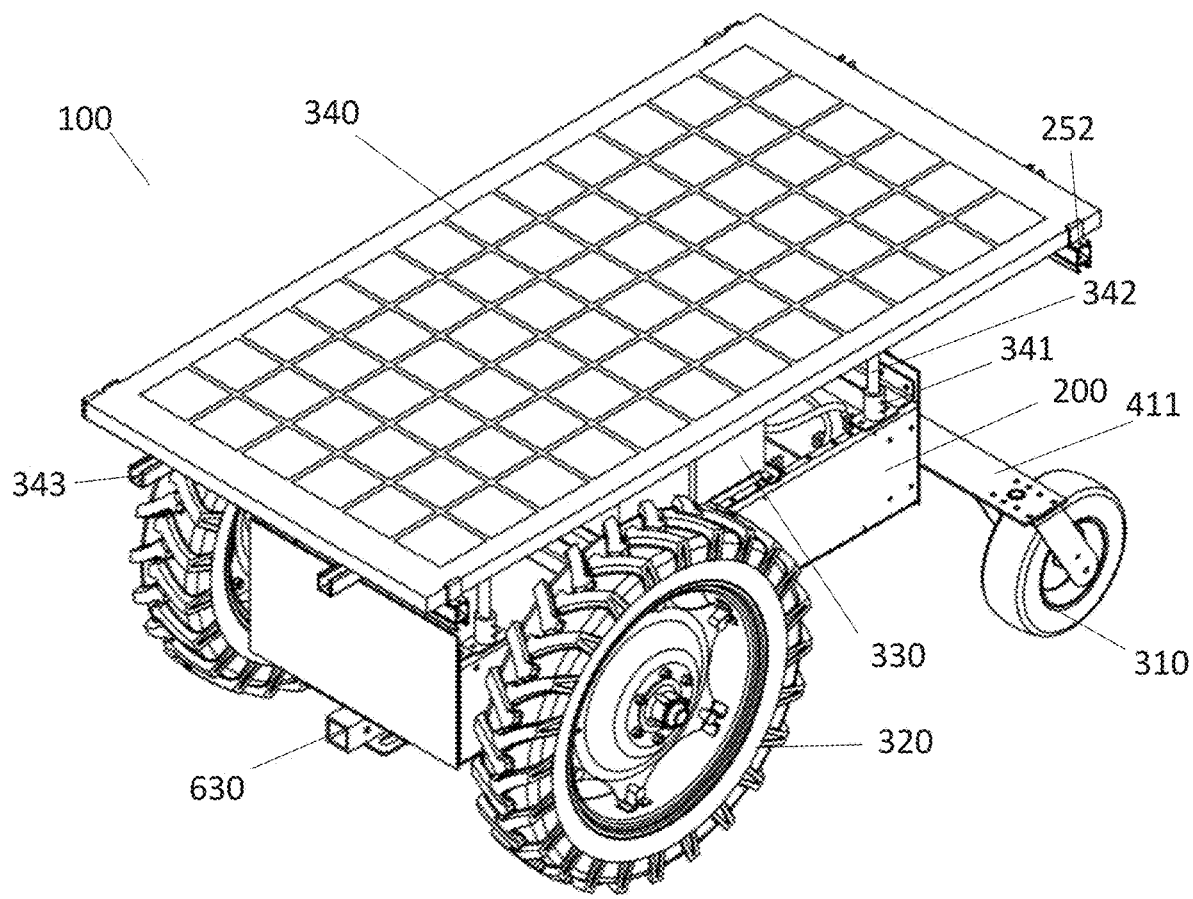
FIG. 32 is an elevated perspective rear view of the LCR with large traction tires used as the rotatable members for the rear and the seesaw caster configuration for the front.
Figure 33:
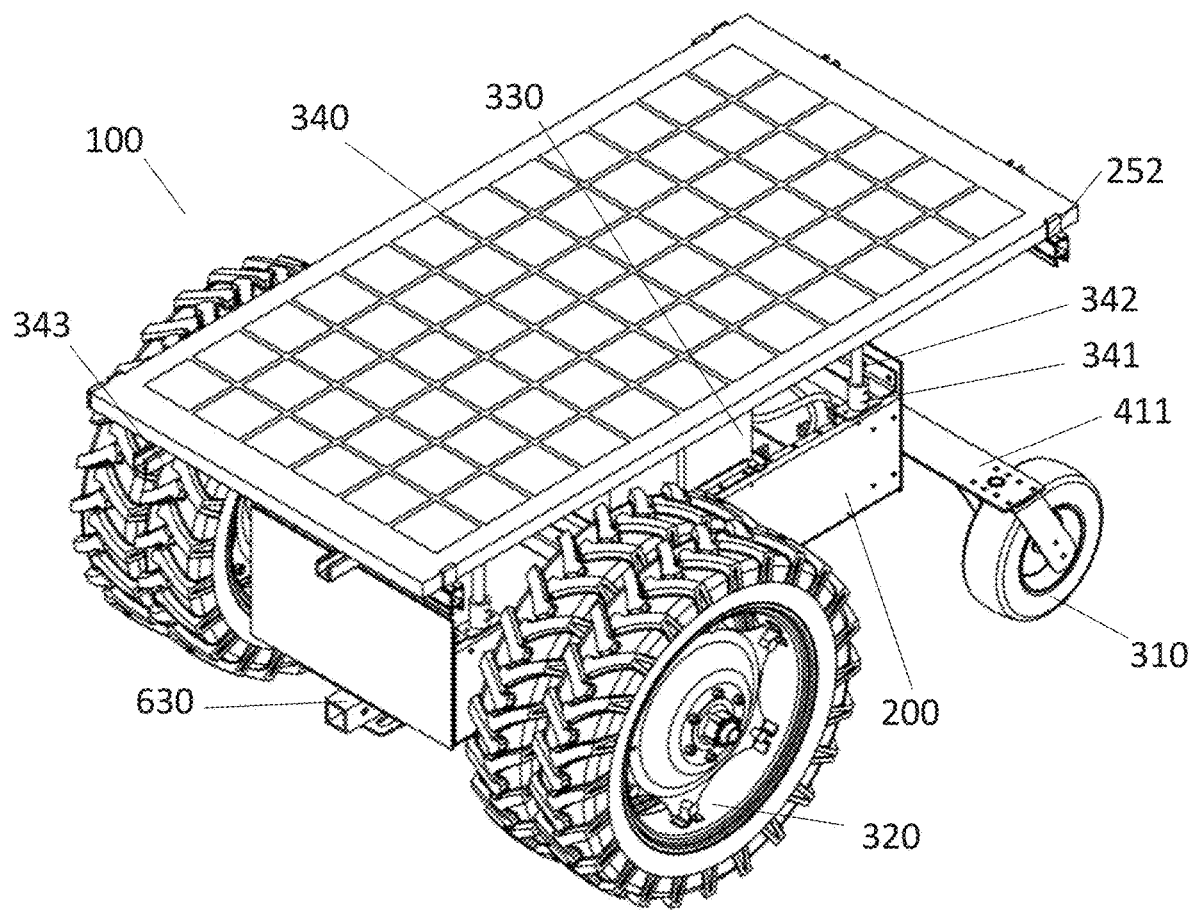
FIG. 33 is an elevated perspective rear view of the LCR with an extended rear axle, two large traction tires on each side used as the rotatable members for the rear, and the seesaw caster configuration for the front.
Figure 34:
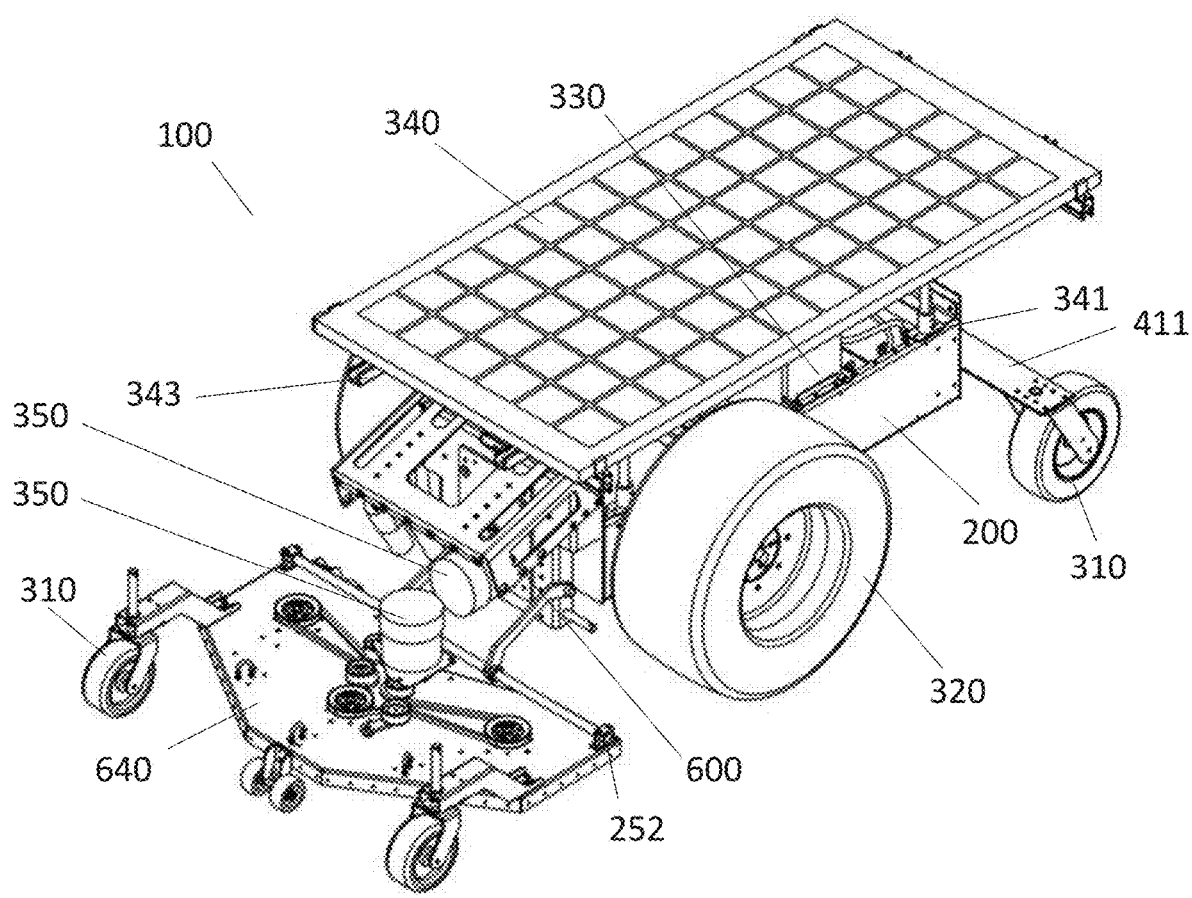
FIG. 34 is an elevated perspective rear view of the LCR with a mowing accessory attached.

Also, the driven or powered wheels are in no way limited by the type of rotatable member employed. Or, by the number of rotatable members employed. For example, FIGS. 32 and 33 where FIG. 32 shows large traction tires used as the rear, power driven rotatable members. FIG. 33 also shows large traction tires but in this configuration there are two tires on each side of the LCR. As described above, this is accomplished by using a longer axel 412 that is easily added to the LCR.

Figure 14:
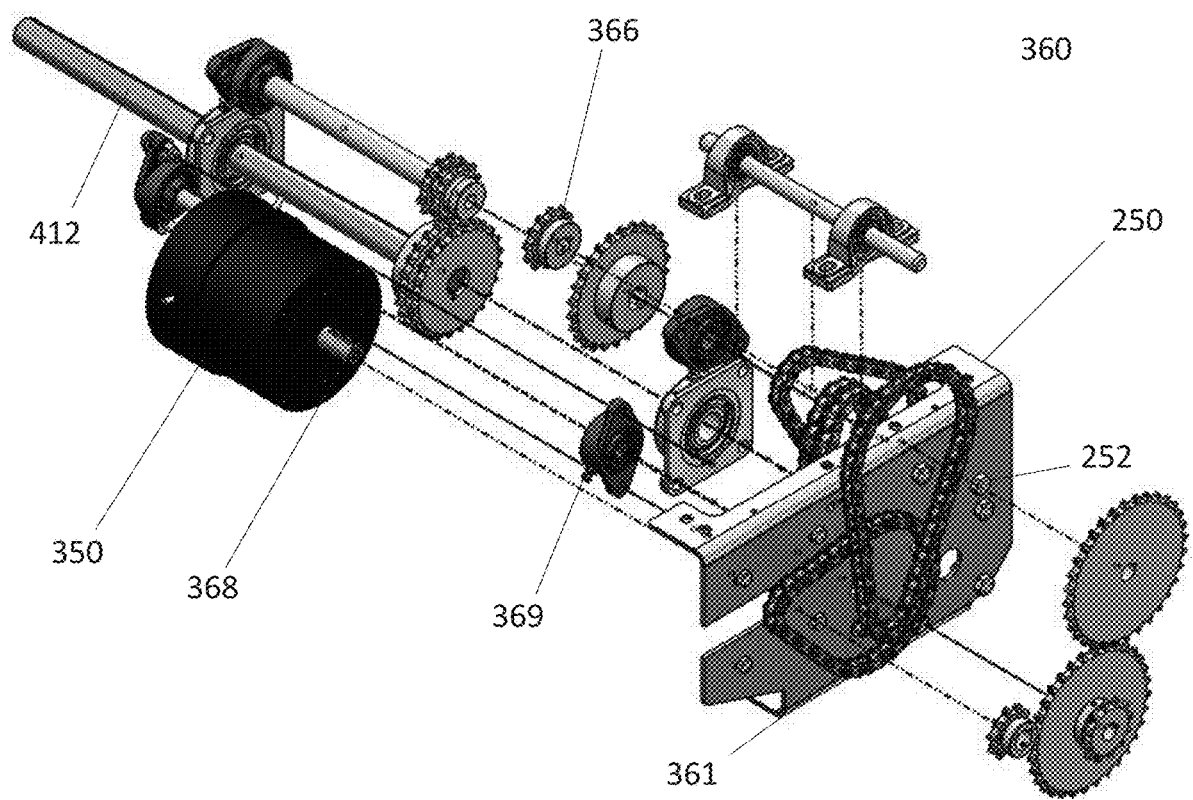
FIG. 14 is an exploded view of the second chain reduction and gearing mechanism.

As noted above, the LCR is ideally powered by a rechargeable battery 330 that is typically recharged using the at least one onboard solar panel 340. This at least one power supply 330 is in the preferred embodiment at least one rechargeable battery. After the rotatable members are affixed, the at least one battery 330 is secured to the frame 200. The system is not limited to one battery 330 but could be any number of batteries and/or type(s) as long as they fit on the machine or are connectable to the machine. For example, it is possible to stack batteries one on top of the other. It is possible to mount them on top of a chassis or frame cover or under the panel, they can be pulled behind or pushed in front of the machine, for example, using an off the shelf cart or anywhere else imaginable, all interconnected using simple wire conduits to connect the packs one to the other. It is also noted that the type of battery is not limited to the existing technology. As battery technology advances, the type, number and configuration will change and the system therefore is not limited to batteries currently available. As shown in FIGS. 3 and 14, these batteries 330 are placed on the base and are held side to side by the L-bracket cross-body connecting members 270 and are tied down to the base 290 by strapping. The batteries in the present configuration are simple lead-acid batteries but they could be lithium-ion or any other imaginable type of battery or storage device as noted above, including fuel cells Next, as shown in FIGS. 1, 2, 10, and 15-38, the configurable LCR 100 has the at least one solar panel 340 and at least one solar panel mounting member 341. The LCR 100 is fully capable of running on solar power alone so ideally all of the LCRs are equipped with solar panels 340 that can be directly connected at or slightly above the LCR frame. In a first embodiment the panels are one sided and can provide power to the LCR.

Figure 37:
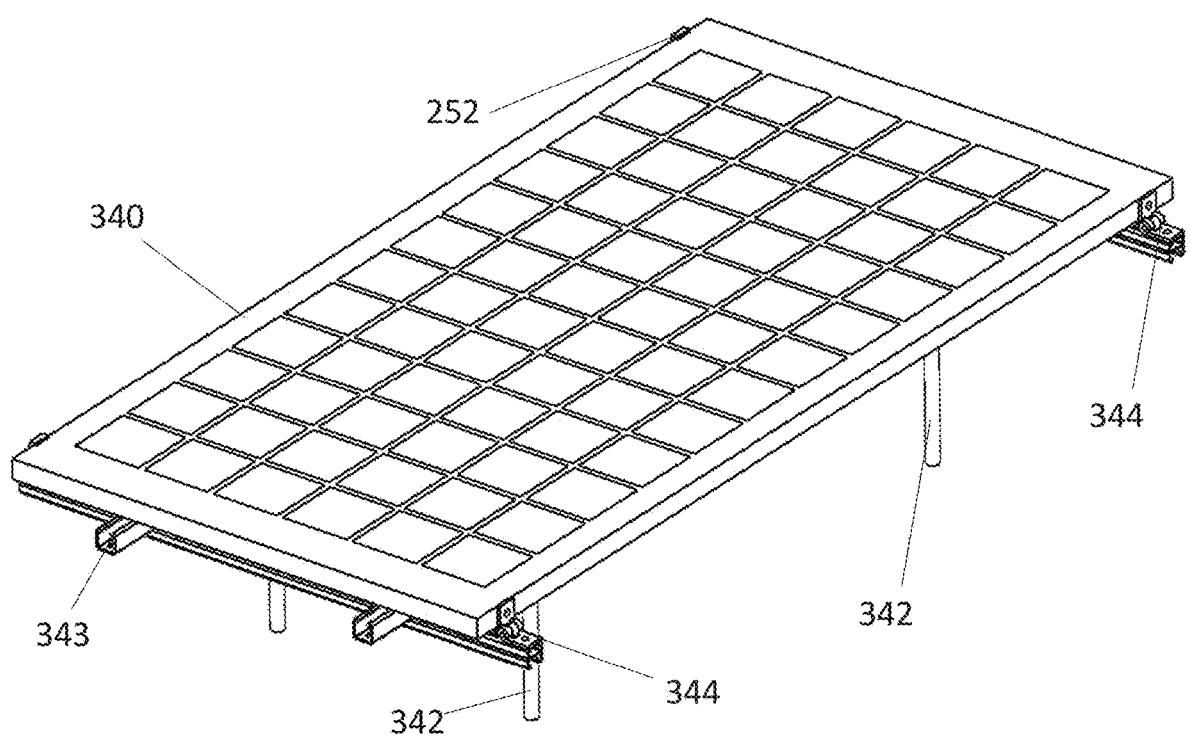
FIG. 37 is an elevated perspective view of one of the hinged solar panels used in this invention.

Alternatively, the panels can be elevated so that double sided panels may be utilized. In order to elevate the panels, the chassis 200 has a solar panel mounting apparatus that has a series of receiver members 341 that are configured and shaped to match a solar panel mounting pole 342. These are generally circular shaped receivers that are located at each corner of the LCR frame 290 but can be any shape or design, as long as the solar panel mounting poles 324 matingly fit within the receiver. Then solar panel mounting poles 342 are used to elevate the solar panels above the main frame. The solar panel mounting poles 342 are typically cylindrical, but could be any shape, and have a first end that is matingly fitted into the circular shaped panel mounting members 341 at the base corners. The poles 342 extend upwardly and have a second end that is connected to the solar panel mounting frame 343, as shown in FIG. 37. FIGS. 4, 37 through 41 shows the solar panel mounting members 341 at each corner of the chassis 200. These are easily affixed to the chassis 200 using the fasteners 252 and the frame holes 390. The solar panel mounting pole 342 is used in some configurations to elevate the solar panel 340 above the main chassis 200. When used, one end of the solar panel mounting pole 342 is inserted into the mounting member 341 and is affixed thereto. A second end of the at least one solar panel mounting member pole 342 is then connected to the at least one solar panel so that the panel is elevated above the chassis. The distance between the panel and the chassis can be fixed or it can be variable. It is possible to have the panel 340 be directly connect to the chassis so that there is no space, or, as just described, it is possible to have connectors, extenders, and other mounting mechanism to raise or elevate the solar panel above the chassis at a predetermined distance. Once in place the solar panel 340 is operatively, or electrically connected to the at least one power supply 330, providing power from the at least one solar panel 340 to charge and recharge the at least one power supply 330.

The frames are made from Unistrut or channel or any other framing material, including bamboo or other renewable material. The mounting poles 342, which also can be made from a variety of environmentally friendly materials such as recycled metals or even bamboo, are connected to the Unistrut frame that forms an upper mount for the panels at the second end of the mounting poles 342. This configuration raises the solar panels above the LCR 100 and thus provides space between the bottom of the solar 340 panel and the LCR 100. This space allows for the use of bifacial solar panels. Bifacial solar panels produce power from light that hits both sides of the panel. Using dual-sided solar cells provides more surface area to absorb sunlight, and therefore, higher efficiency in the same form factor. This system also creates a variety of solar panel mounting orientation variants. For example, one panel can be mounted lengthwise. Or, a wider mounting system can be created and additional panels added side by side. In fact, the system has been tested using three panels configured side by side. In certain embodiments the panels can be mounted widthwise. In certain embodiments the panels can be moved (e.g., tilted, stacked). The more panels the more power and so this opens up the system to longer working hours and also provides the ability to energize more power-hungry machines.

Another problem with having the solar panels directly mounted to the LCR, or even slightly above the LCR, is that it restricts access to the internal parts, such as the battery, computer system, and connectors. This problem is solved by adding at least one hinge 344 to the panel 340. FIG. 37 shows the solar panel of the present invention but instead of having the panel directly connect to the chassis there is another frame built below the panel that then has the at least one hinge 344. This frame reinforces the solar panel so that it can be freely moved, elevated or pivoted without damaging the solar panel. The at least one hinge 344 is connected to the frame. This hinge can be any type of hinge as long as it provides a pivot for the solar panel. In FIG. 37 there are two hinges, one at each corner of the panel. In this configuration the panel can be tilted up and out of the way, exposing the body parts underneath. This tiltability provides a variety of benefits. First, as noted and shown in FIG. 38, it allows easy access to the internal workings of the LCR as now it can simply be tilted up rather than having to remove the entire panel. Next, it is possible to use this tiling mechanism to enable greater solar production. For example, the panel could be tilted upwards in the morning and late afternoon and the LCR programmed to work with the panel facing East or West in order to collect more light and it could be programmed to lay flat during mid-day hours. This change in angle could be performed manually or it could be programmed into the system and could utilize electronic mechanisms to pivot the panels. Finally, this pivot can be used as a dumping mechanism, as described below.

As noted earlier, this LCR has the ability to pull and push cargo carrying apparatus but in its basic, standard form, there are no places/ways or limited places/ways to store or carry cargo on or about the LCR itself. Another goal of the present disclosure is to overcome these and other limitations.

Figure 38:
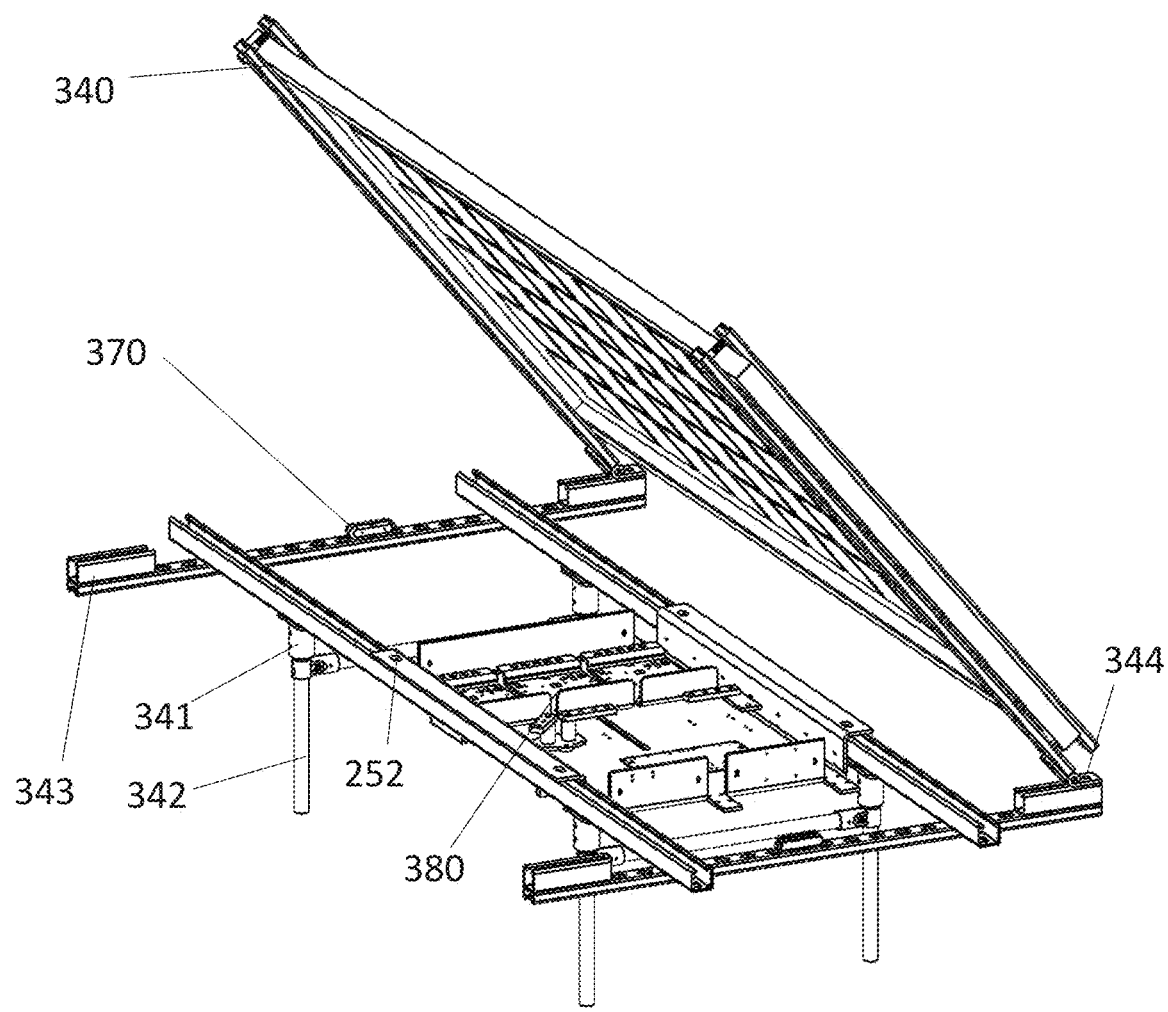
FIG. 38 is an elevated perspective view of one of the hinged solar panels used in this invention in an open hinged position.
Figure 39:
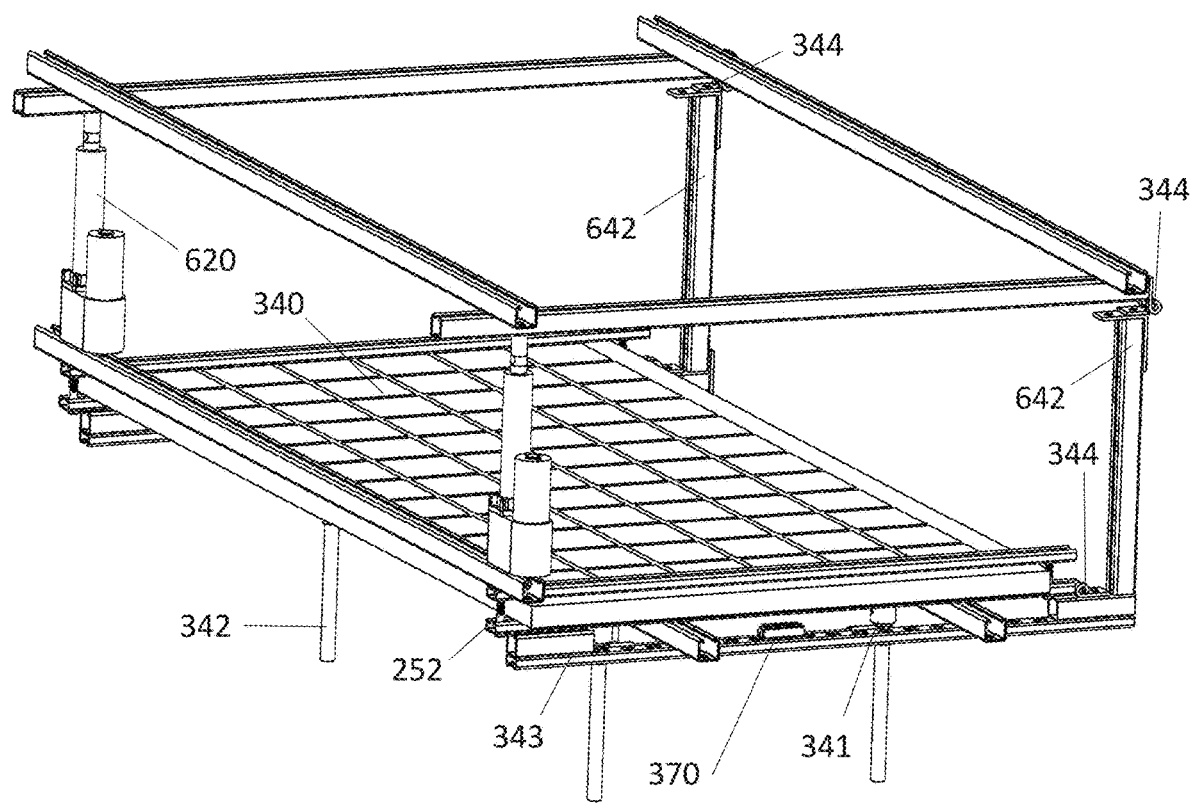
FIG. 39 is an elevated perspective view of the invention with a second frame on top of a first frame in a closed position.
Figure 40:
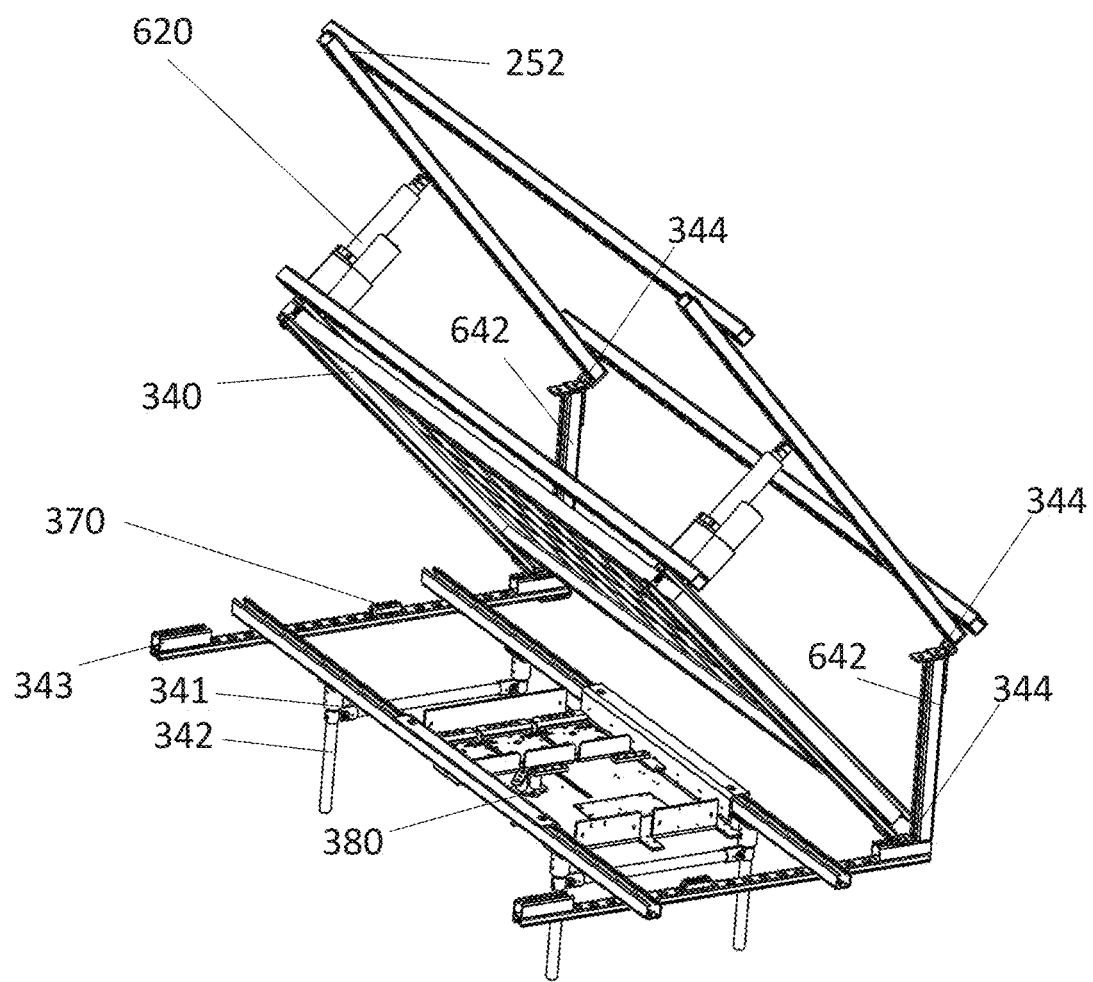
FIG. 40 is an elevated perspective view of the invention with two sets of hinges, one on the solar panel itself and one for the second frame, showing the system using the solar panel hinges to lift up the solar panel along with the second frame to expose the internal components of the LCR.
Figure 41:
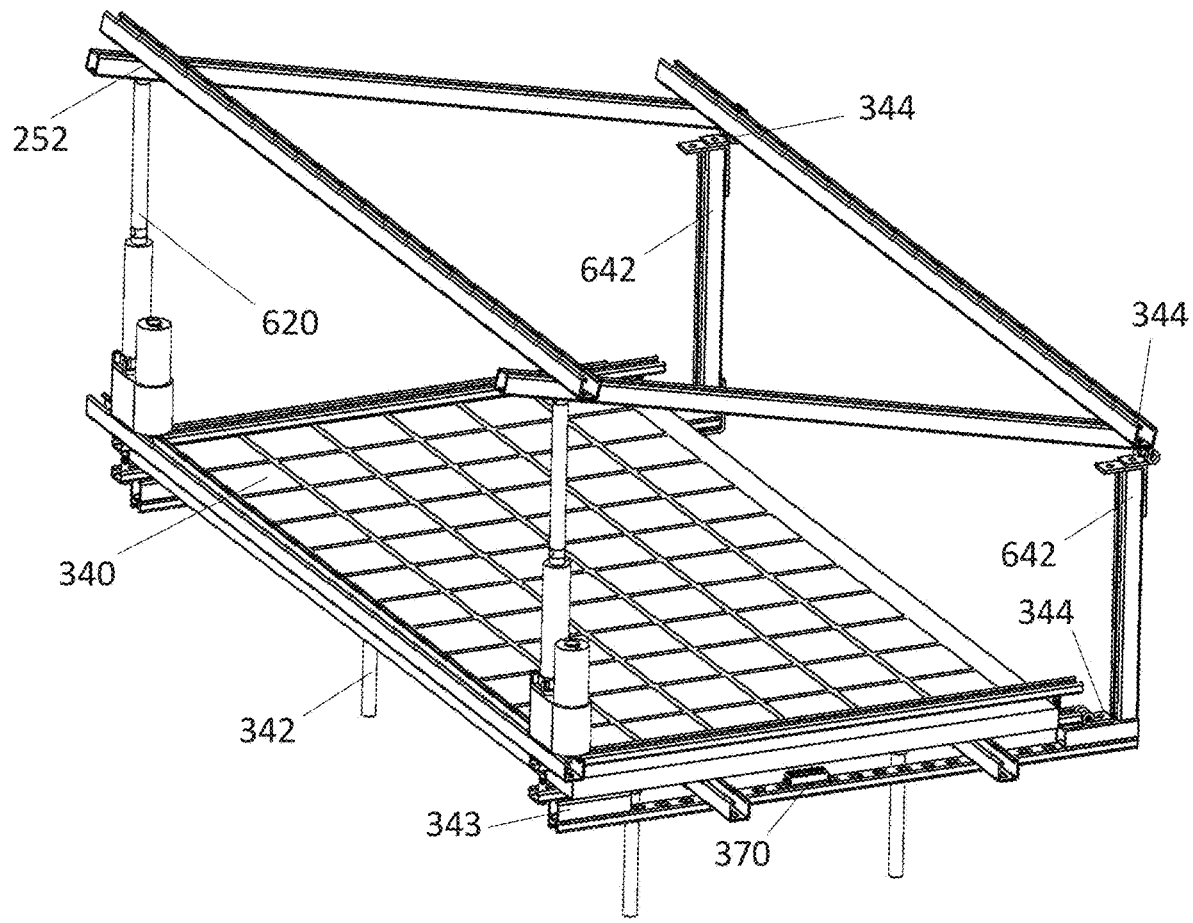
FIG. 41 is another elevated perspective view of the invention and the embodiment of FIG. 40 but now with the solar panel in the flat position and the second frame in an elevated, dumping position.

Another unique invention related to the LCR of the present invention is its potential use as a cargo carrying apparatus, shown in FIGS. 39-41. A first embodiment starts with a frame that is constructed either on or near the perimeter of the solar panel or panels. This frame can be either horizontally or vertically adjacent to the solar panel or panels. In one embodiment it is a U-channel frame that is constructed either around, on or near the perimeter of the solar panel or panels, as shown in FIG. 37. This Fig. shows a base framing along with a pair of hinges 344 at two corners. In FIG. 38 at two ends of the solar panel the channels are used to sandwich the solar panel in order to create a frame upon which another platform can be built. This framing can be extremely substantial so that a platform can be built directly upon the framing and cargo can be carried thereon. In this embodiment the hinges 344 allow the platform to tilt to allow dumping of cargo from the platform or whatever cargo carrying apparatus is employed. Again, this dumping action can be performed manually or mechanically. This tilting ability also allows users easy access to the internal components of the LCR without having to entirely remove the solar panel.

In a second embodiment, shown in FIGS. 39-41, a second frame, similar to the one shown in FIG. 38, is built and positioned above, around or sandwiching the solar panel frame. In this configuration a platform can be placed on this bottom framing or the area can be left open so that the panel can continue to collect unimpeded light. In this embodiment this frame is either level with or slightly above the solar panel frame and further is designed to support and erect perpendicular objects, pillars, or risers 642 at specified locations around the perimeter, as is shown in FIG. 39. In this second embodiment risers 642 are either permanently or removeably affixed, at various locations around the perimeter, and extend upwardly either directly from the solar panel frame or upwardly from a frame constructed next to, outside of, or directly on top of the perimeter of the solar panel frame, as is shown in FIG. 39. These risers 642 can be made from uni-strut or any other material that can provide the required support for a top frame and a platform. They can also be actuators, spring or power pistons or any other apparatus to assist in pushing up the upper frame and platform. Mounted to the tops of these risers 642 is the second frame, as seen in FIG. 39, that is then used as the base for an elevated platform that can carry a wide variety of carrying apparatus, including but not limited to the platform alone, a basin or bowl or any other cargo carrying apparatus. This second frame is ideally located slightly above the solar panel 340 to allow at least some light to access the solar panel 340 to continue generating electricity. This second frame is similar in design to a car roof rack that holds skis or bicycles. This second frame, when affixed to the pillars 642 and in place, ideally does not interfere with the general operation and light collection of the solar panels. It is designed so that it does not cover or obstruct the solar panel or panels and so that these solar panels can still collect as much sun light as possible without interference caused by the frame. In a preferred embodiment the first frame is constructed around the outside of the solar panel frame, the pillars 642 extend upwardly therefrom, and the second frame is constructed at the tops of the pillars 642 at the varying locations around the perimeter, as seen in FIG. 39. In this way the solar panels remain exposed and open to unimpededly receive sunlight. In either case it is envisioned that the rack is made from metal channel or bars and that these bars or channels still allow for sunlight to contact the solar panels with little interruption. The Figs. all show the second frame alone, without the platform attached.

When in use, this second frame, either in the first embodiment that is adjacent to or just slightly above the solar panel frame, or the second embodiment that has some separation between the solar panel frame and the second frame, is used as a load bearing frame for attachments thereto. Obviously, when the platform is in use the solar panels will be covered, at least partially, and will not be as effective as when uncovered. However, it is envisioned that attachments, such as panels, platforms, etc. can be easily removed in order to free up the solar panels so that they may generate power as desired. This top frame can be seen in FIG. 39. FIG. 40 shows one configuration where the solar panel and frame configuration has a number of hinges. One set allows the second frame to pivot and another set allows both the solar panel and the top frame to pivot. Thus, the attachments can either be removed entirely, or, they can be pivoted up and out of the way.

There are a number of ways to use this first and second frame configuration. First, a platform can be built or placed directly on top of the second, elevated frame. This platform can be made from a variety of products. It can be plywood, 2×4s, metal, plastic, or any other material that can form a platform base. The frames and/or this platform can extend end to end and side to side of the existing solar panel but also can be any desired configuration and in any length. That is, it is not restricted to the width or length of the solar panels or the LCR but in fact can be longer or wider than the panel itself or longer and wider than the LCR itself. It is preferable that it not be shorter than the actual solar panels as it is designed to protect the panels from whatever cargo is loaded onto the platform, and also provides weatherproofing for the LCR's internal working components. However, if a platform is constructed on the first frame then it can be designed to cover and protect the solar panel and in this embodiment the second platform can be of any size or shape as the solar panel is protected via the first frame platform. In any embodiment, the platform or platforms then can be used to carry cargo directly thereon. Additionally, the platform can be used as a base for other cargo carrying apparatus, such as a large bucket or buckets, boxes, containers, bicycle racks, ski racks, yard equipment racks, or any other rack or container used to carry cargo. There are an unlimited number of cargo carrying apparatus that could be affixed or carried by one or even two platforms.

In some instances, it is beneficial to raise the second rack and platform up and out of the way in order to allow more sunlight access to the solar panels or to easily dump the cargo from the platform or from attached cargo carrying members. In one embodiment this is accomplished by having the platform tilt, or pivot upwardly so as to allow more sunlight access to the solar panels, or to cause cargo to slide off the platform using gravitational assist, as shown in FIG. 41. This is accomplished by having at least one pivoting edge or side. In one embodiment the panel is hinged on one side in one or more locations to allow, for example (a) for easy access to the area below the panel; and (b) to tilt the panel to increase the solar efficiency depending upon the location of the sun, as shown in FIG. 40. This allows the operator to get at the internal parts of the robot. It also allows the solar panel to be adjusted so that it can collect more sunlight in differing positions. The hinged side, or pivot side, can use a variety of different methods to create this tilting or pivoting edge. It could be something like a piano hinge, a door hinge, a living hinge, a pivot member, a butt hinge, spring hinge, or basically any type of pivot or hinge that will allow the member to pivot or rotate. This is also extremely useful for having the platform tilt so that it can dump whatever it is carrying. This effectively turns the robot into a mini-dump truck and is shown in FIGS. 39 and 40.

Also as shown in FIGS. 39, 40 and 41, there can be two sets of hinges 344. In FIG. 39, as in FIG. 38, there are hinges 344 connected to the solar panel itself that allows the panel to pivot in order to access the internal parts of the LCR beneath the panel. In addition, there are hinges 344 located on the second frame above the solar panel. This set allows the second frame to tilt independent of the solar panel itself. To assist with this tilt lift actuators 620 are employed. At the top of these lift actuators are strut balls that are inserted into the strut channel and that allow the strut to slide as the actuators are extended and the frame is lifted and elevated. This lifting system creates the dumping ability, as described previously. FIG. 39 shows the system with dual hinges in a closed position. FIG. 40 shows the dual hinges with the first, lower set of hinges pivoting the solar panel and the second frame up to allow access to the LCR internal components, and FIG. 41 shows the dual hinges but with only the second frame pivoting and lifting to perform the dumping function.

There are also a number of ways to move or tilt the panel. In a very inexpensive and simple version the panel can simply be moved manually. A user would manually pull the panel upwards in order to access the internal components of the robot or to dump cargo from the platform. In another embodiment the system uses the lift actuator 620 such as a piston or spring to assist in lifting the panel. This embodiment requires a combination of human assistance and mechanical assistance. There is at least one piston or spring but there can be more than one and at more than one side. Multiple lift actuators 620 such as pistons or springs would make it easier for the platform to pivot as they could provide more assistance and more lift to the platform when being pivoted.

In a more sophisticated embodiment the system includes powered or motorized pistons or actuators that use motors to automatically pivot, tilt or dump the platform. This system is preferred as it does not require human lifting assistance. The motors are powered by the onboard battery and solar power system. This system can be controlled by the user with push buttons on the robot, or remotely from an app on a phone, for example, or it could be programmed to operate at specific times. If the robot is used to carry dirt from one location to another, it can be programmed to automatically dump the dirt at the desired location after arrival. Obviously, there are a wide variety of applications that could be programmed into the system.

In the above-described embodiment the platform system only tilts in one direction. This is limiting in actual use and therefore the system can also have multiple hinged sides. Here there are hinges on more than one side, thus providing a way for the panel to tilt or lift in multiple directions. When configured optimally, this allows the platform to tilt in an unlimited number of directions. This is accomplished with a variety of side hinges. When configured properly the sides can each pivot. This allows for dumping cargo in any number of directions, such as front, back, side and other side. It is also possible to have this same system incorporated into the solar panel framing so that the solar panel or panels can be moved in a wide variety of directions. In this way, the solar panels could actually track the sun when in use, thus collecting more light throughout the day.

This multi-pivot system can be accomplished by having a central pivot point, or something like a ball joint, that allows the panel to pivot, rotate, spin, etc. in unlimited directions. This ball joint or pivot member is placed on top of the solar panel by using a series of supports for the ball and then the ball centrally located at a main axis point. In this configuration the panel could dump in any direction as long as the system is mounted far enough above the panel to allow for enough tilt to create a gravitational dump. The cargo carrying platform would also need to be slightly larger in area than the solar panel in order to allow the dump and not have material fall on the solar panel below.

Because the solar panels are, by their nature, somewhat delicate, it is important to protect them from damage and harm. Obviously, when carrying cargo items on top of the solar panels it is preferable to have some sort of protection for the panels. In one alternative embodiment the solar panels are protected by placing additional bracing, struts, plywood, framing or other materials over and possibly around the outside of the solar panels. This is particularly useful and beneficial if the LCR is shipped or moved to another location. In one embodiment these panels could be taken off and actually used as a shipping crate for the LCR. Once it arrives at its destination the panels are pulled off and used on top as the platform, or even as a trailer.

In some embodiments the construction around the panel is extended vertically downward by placing vertical struts and/or plywood to create a crate, such as a full crate, or skeletal crate. This crate acts as a shipping crate or packaging crate.

In some embodiments a receptacle, or cargo box is created above the strut channel frame to store and/or haul cargo. Cargo is anything, such as logs, sand, gravel, rocks, debris, yard waste, compost, dirt or snow, for example, if used for land care. Obviously if not used for land care the cargo could be virtually anything. The cargo box is made from plywood or other material. It can be rails, or bars, or any material that can form a storage unit. As described above, it is possible to have the platform tilt in order to dump its contents, so if the cargo box is on top of the platform it is preferable in some instances to have a swing end or swing side, that allows for easily dumping contents from the platform. This is desirable but not required. As the unit could potentially carry very heavy cargo, it is important that the strut base is assembled from strut channel of sufficient strength to withstand the potential carrying weights envisioned.

The cargo box, and the platform, can be configured in a wide variety of designs. For example, it could have slatted sides, wooden sides, metal sides or plastic sides. These side panels and platform can be slatted or solid. There can be a lining used to secure cargo within the cargo box. For example, the liner could be plywood or other simple building materials. However, if it is desired that the cargo be a fluid or liquid, then it is also possible to use a tarp or plastic liner so that certain types of cargo, such as sand, gravel, water, or other fluids, may be held within the cargo box without loss.

It is also important that the platform be securely attached to the strut channel. This also can be accomplished in a number of ways. One method includes using clamps, such as those that are commonly used to secure solar panels to roofs. As there are numerous ways to secure to strut channel it is to be understood that this invention is not limited by one type of application.

Figure 7:
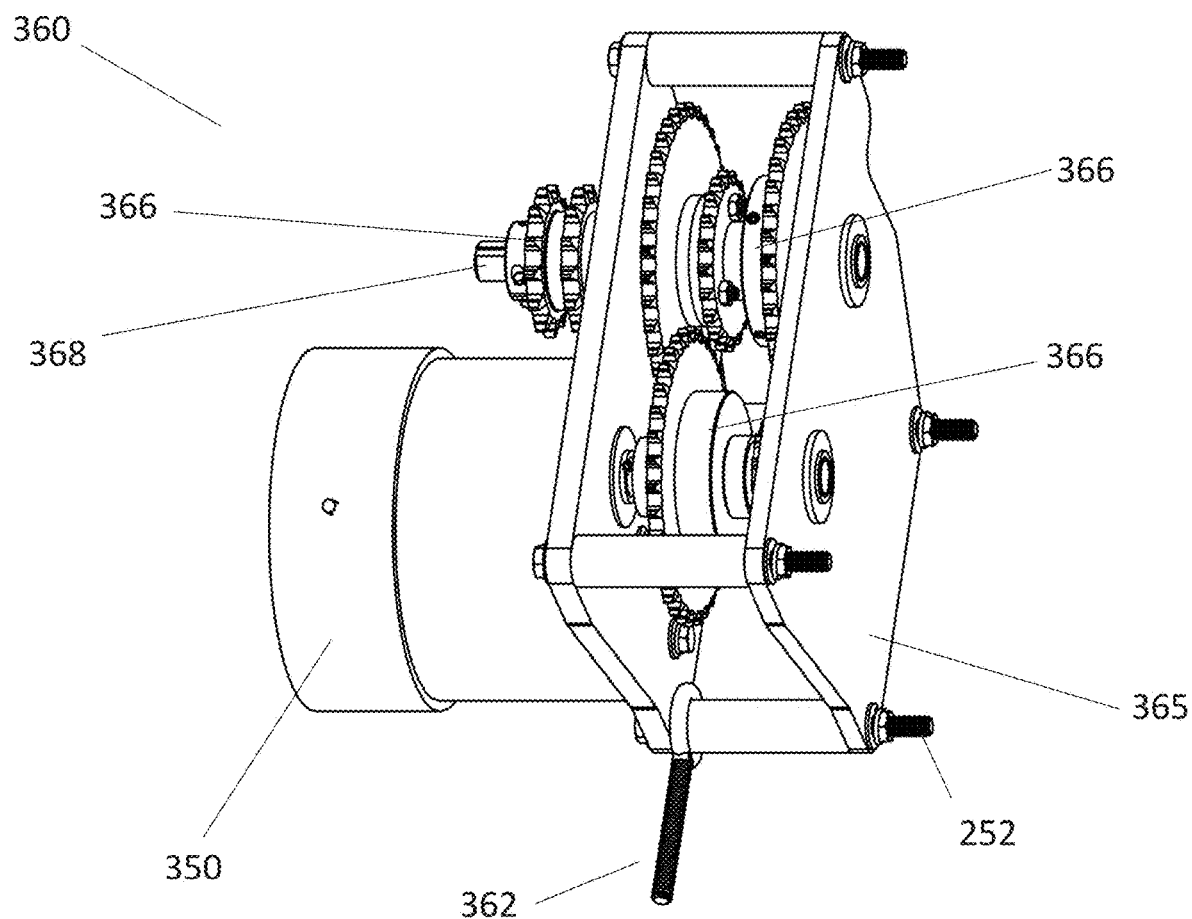
FIG. 7 is a view of a first chain reduction mechanism and a chain tensioning mechanism.
Figure 8:
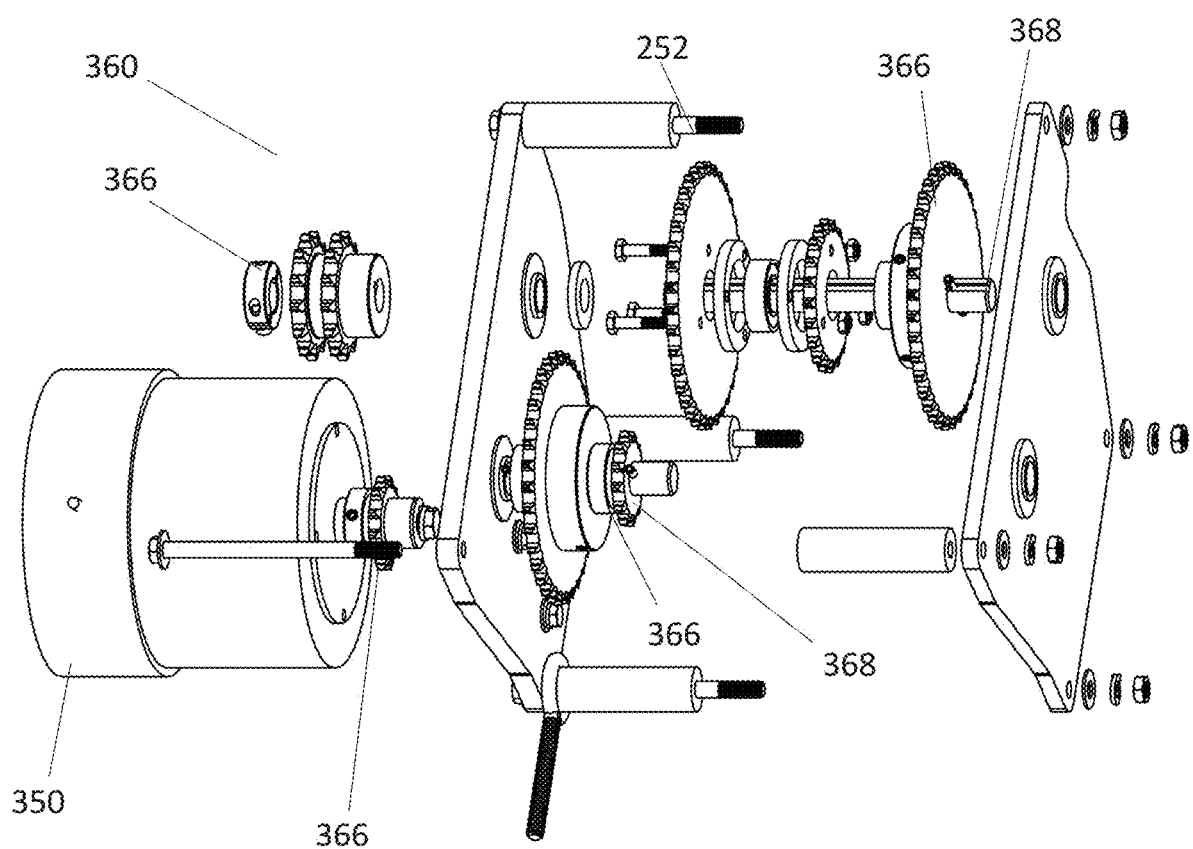
FIG. 8 is an exploded view of a first chain reduction and gearing mechanism.
Figure 9:
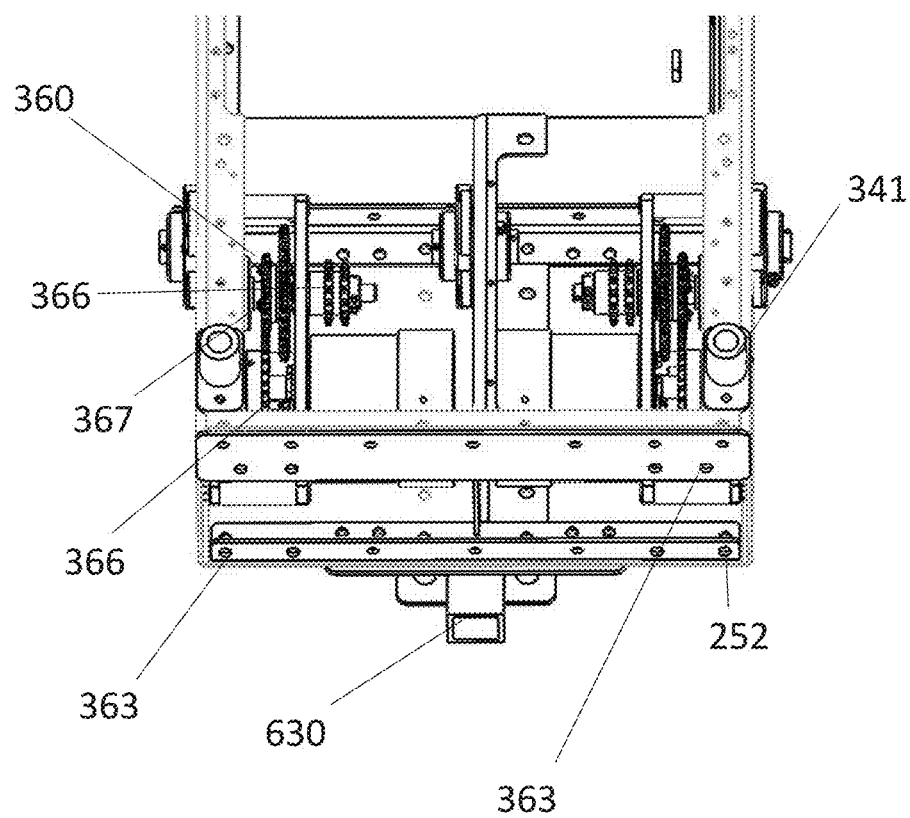
FIG. 9 is view from on top of the first chain reduction and gearing mechanism.
Figure 10:
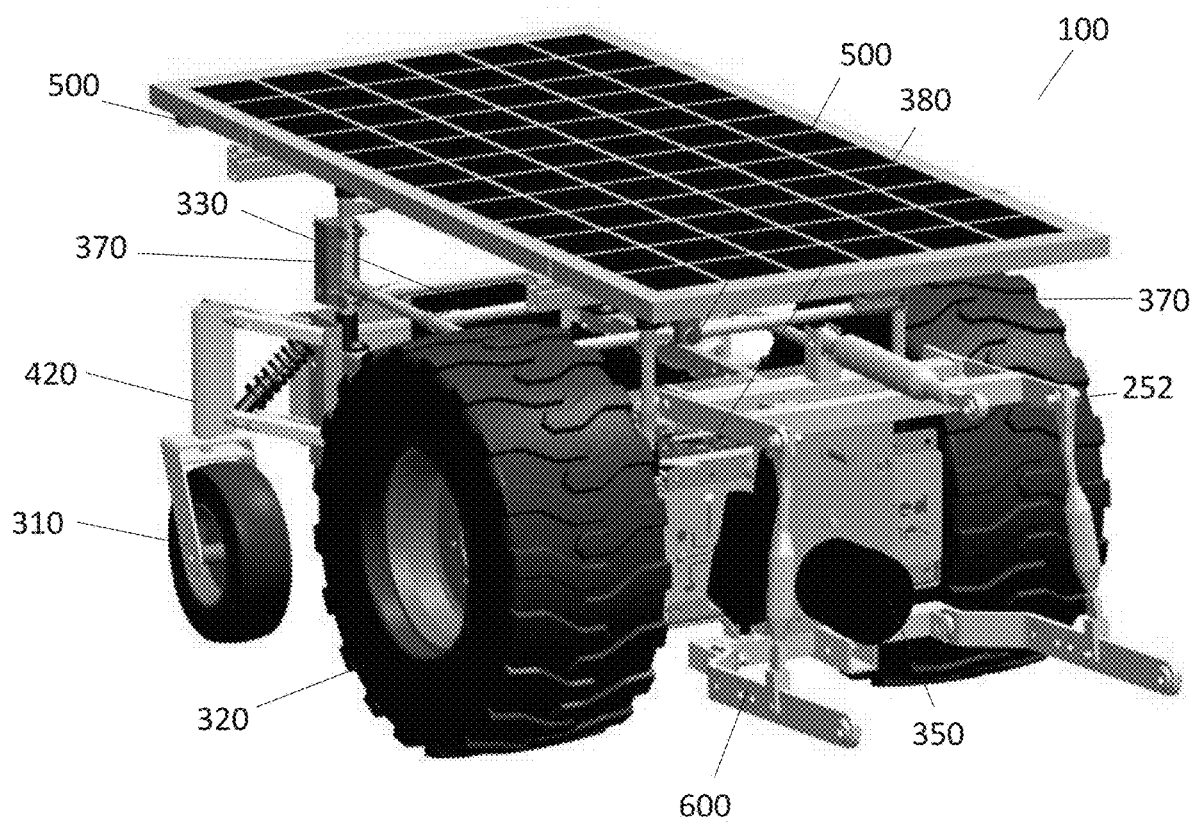
FIG. 10 is an elevated view of the LCRs of the first embodiment from the rear with a solar panel attached, a three-point hitch mechanism attached in the rear, and a power take off (PTO) drive.
Figure 13:
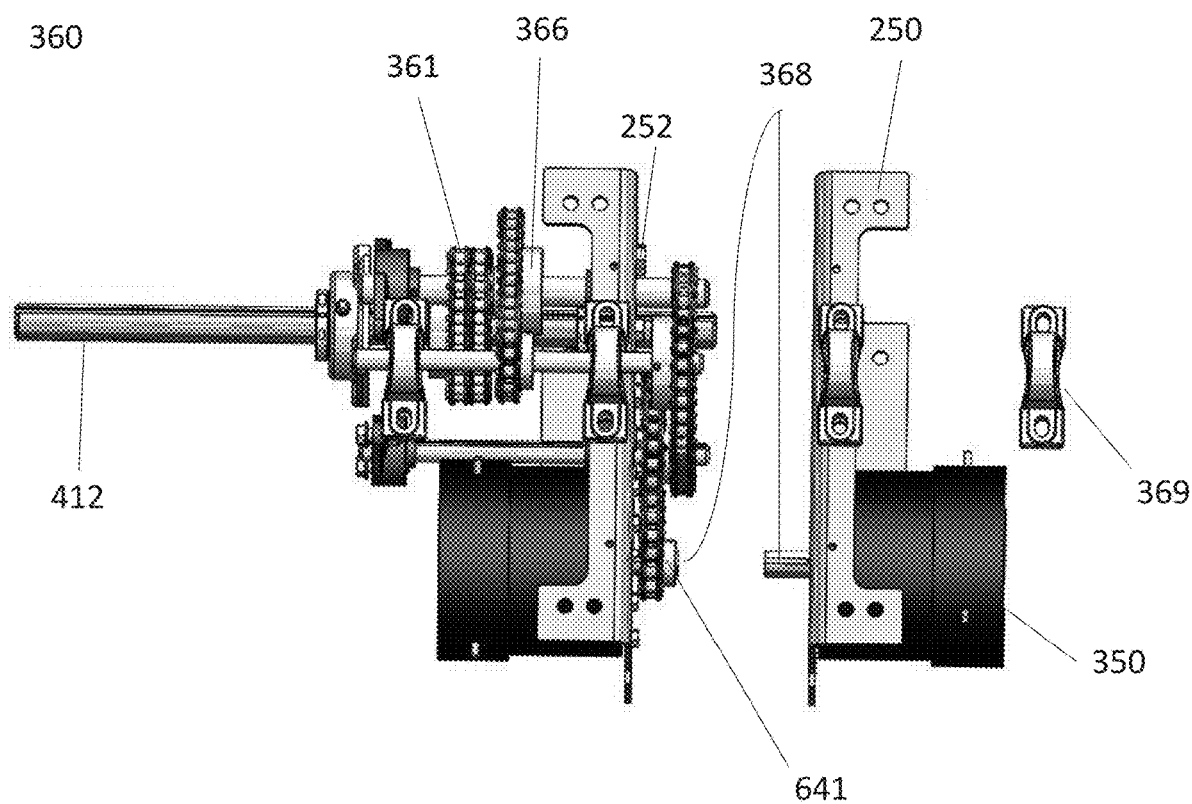
FIG. 13 is a top view of the second chain reduction and gearing mechanism.

The LCR 100 uses electric power generated from the solar panels to power the LCR. The LCR 100 has a unique and yet simple system for installing and maintaining this system where the system includes at its most basic configuration the electric motor 350, the at least one gearing mechanism 360 and the at least one chain 361. When assembled, the electric motor 350 as shown in FIGS. 7-9 and 12 through 14 is connected to a chain reduction or gearing mechanism 360. This gearing mechanism 360 has a first face 365 that is secured to the uni-member bended frame. Once in place the at least one chain 361 is connected between the gearing mechanism 360 and a rotatable member gear. FIGS. 7-9 show a first chain reduction system, useable with the LCR. FIG. 7 shows the system connected to the electric motor, ready for installation. FIG. 8 is an exploded view of this same chain reduction system and FIG. 9 shows a top view of the same chain reduction system when in place in the LCR. FIGS. 7 and 8 also show a chain tensioning system. FIGS. 12-14 show a second, preferred chain reduction embodiment. FIG. 12 shows this second chain reduction embodiment installed within the LCR chassis. FIG. 13. is a view from the top of this second chain reduction embodiment, and FIG. 13 is an exploded view of this preferred system. In this preferred system the vehicle uses a four-stage chain reduction that reduces the RPMs at a motor shaft 368 that is typically 4000+ RPM to the desired rotation at a driven axle. In this embodiment it is entirely possible to use off the self, robust but low-cost bearing blocks and pillow blocks for bearings to hold the axles of each stage, with spherical bearing joints to tolerate misalignment. This design provides an extremely high torque drive train. This design and configuration allow the vehicle chassis to flex without negatively affecting this high torque drive train. This embodiment features a composite chain sprocket that is composed of a large sprocket welded to a smaller sprocket that then provides a compact design and the ability to get a large reduction ratio on the same shaft. These composite sprocket components can either be welded together or connected with bolts. On the last stage of the reduction, it is preferable to use a double chain (ANSI #50-2, vs ANSI #50-1 in earlier stages) so that 1000s of ft.lb of torque can be applied.

As with the other parts of the chassis, the chain reduction system is designed in such a way that it is field repairable. The motor can easily be removed and replaced, all shafts can be removed and replaced, and all the bearing blocks can also be easily replaced. As explained above, once in place the at least one chain 361 is connected between the gearing mechanism 360 and the rotatable member gear connected to the driven shaft, connected to the wheels or tracks that enable the robot to move. The reductions have an output shaft, with a sprocket, connected with a chain, to another sprocket, which is attached to the driven shaft and/or axle. The fact we can quickly detach the chain, and remove/replace reductions, plus, change the driven shaft and axle quickly, is valuable. In addition, the system uses chains everywhere, it is easy to repair and service.

In either configuration, with use and over time the chain eventually begins to stretch. This is a known problem called chain elongation and the current invention provides an easy solution. FIGS. 7 and 8 show an elevated perspective view and an exploded view of the electric motor 350 and the first embodiment of the chain reduction assembly 360. The at least one chain 361 is connected to the system over the teeth and pulls during use away from the tensioning bolt 362. As the chain elongates it becomes important to tighten the chain so that it continues to perform properly. This is accomplished in the present invention by simply rotating the nut on the end of the tensioning bolt 362. The bolt is connected to the reduction assembly 360 at a cross member at a lower side of the reduction assembly and as the nut is tightened it pulls the entire gearing assembly away from the chain direction, thus tightening the chain or chains. On the side of the frame there is also a tensioning slot 363 as shown in FIGS. 7 and 8 that assists the bolt 362 in keeping the system tight and aligned.

In this embodiment the tensioning system described above is entirely manual. That is, a user must periodically check the system to make sure that the chain is tight and that there is no slack present and then if there is slack the user must manually tighten the nut on the bolt 362 in order to tighten the chain or chains. Alternatively, it is possible to have an entirely computer-maintained system whereby a sensor is installed to monitor the chain and as it elongates and becomes loose the sensor will send a warning to the onboard computer. The computer will then send a command to an electronic tightening apparatus that will basically perform the identical function as if done manually but it will be accomplished automatically and electronically. Tension sensors convey data to the computer in order to properly set the chain tension.

A second embodiment of the chain reduction system is shown in FIGS. 12, 13 and 14. In this system. This is an entirely new chain reduction system. This system also can have issues with chain elongation but it in this embodiment there is a tensioning gear that keeps the chain taught.

This entire system as a whole is safer than using a standard farm machine or tractor because it removes the human from many common tasks. First, it does not require human interaction to perform tasks such as mowing, plowing shoveling, tilling and many more. Next, the system is charged via solar panels and onboard batteries, thereby removing additional human interaction. Finally, the system is equipped with other safety measures, including emergency stops, or E-Stops 500. FIG. 1 shows an E-Stop 500 located at the front upper right-hand corner affixed to the solar panel mounting rack. This is a basic stop that is push activated, typically by a human user, to immediately stop certain actions or all actions on the LCR 100 (for example, by cutting all power to the motors and/or by applying a brake). This provides a means for a human user who is monitoring the system to immediately stop the unit from certain actions or all actions. However, there may not always be a human user or operator available, so it is also possible to place E-Stops 500 at a variety of locations around the LCR 100. For example, there could be a series of E-Stops 500 placed across the front of the LCR so that if the LCR does not stop when it is supposed to, and it accidently continues forward motion, then when the E-Stop 500 contacts an obstacle the obstacle will trigger the E-Stop 500 and the LCR will stop in reaction to the trigger. Likewise, the E-Stops 500 can be placed across the sides and/or back of the LCR or anywhere on the LCR where there is the possibility of colliding with obstacles. The ability for any one or all of the stops to work is possible because the E-Stops are daisy chain connected so that when any one of the E-Stops 500 is triggered the LCR 100 will cease to power motion.

The LCR 100 is also created for and designed to pull or push any number of attachment apparatus or accessory. These accessories could be snowplows, snow blowers, shovels or blades, rakes, mowers, trimmers, sprayers, spreaders, feeders, discs, chain harrows, or any other apparatus or accessory that can be affixed to the LCR via the hitching mechanisms. The LCR is also equipped to use receivers, hitches and other connectors (e.g., a standard receiver/shank type receiver and/or a 3-point hitch system). These apparatuses can either be connected to the LCR manually whereby the user physically connects (and disconnects) the apparatus to the LCR via either the receiver/shank system or the 3-point hitch, or the LCR can be equipped with Smart-Connect whereby the LCR 100 itself, using the onboard computer, can automatically engage and connect (and disconnect) an accessory to the LCR 100. Any of the accessories can be configured to be either manually attached or electronically attached. Also, the accessories, when powered, can either get power mechanically or electrically. If electrically it is preferred that they use power from the onboard battery 330 but it is also possible to have their own battery or power supply built into or on the accessory.

In addition to being able to pull or push these accessories it is also possible as just noted to power them using the LCR 100 onboard batteries. Many accessories, such as snow blowers or tills or mowers, require power to operate. There are a variety of ways to connect the LCR to these accessories so that the accessories can use the LCR's power rather than use fossil fuel.

Figure 5:
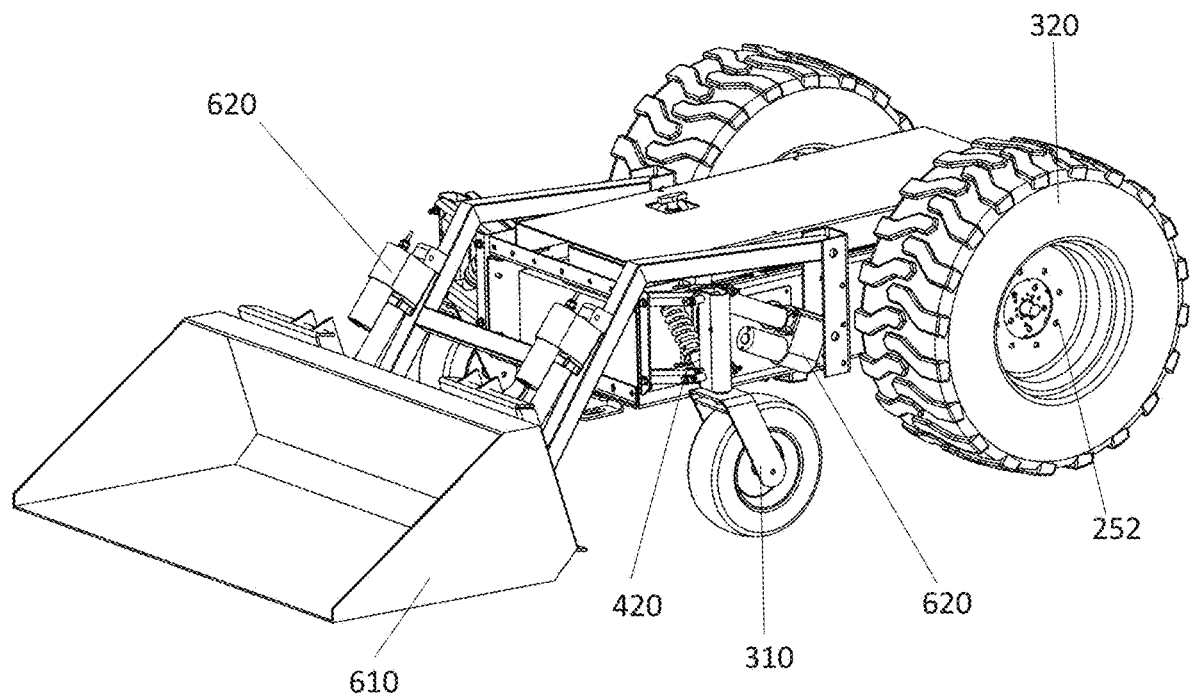
FIG. 5 is an elevated view of the first embodiment with a front loader attached to the LCR and no solar panels attached.
Figure 6:
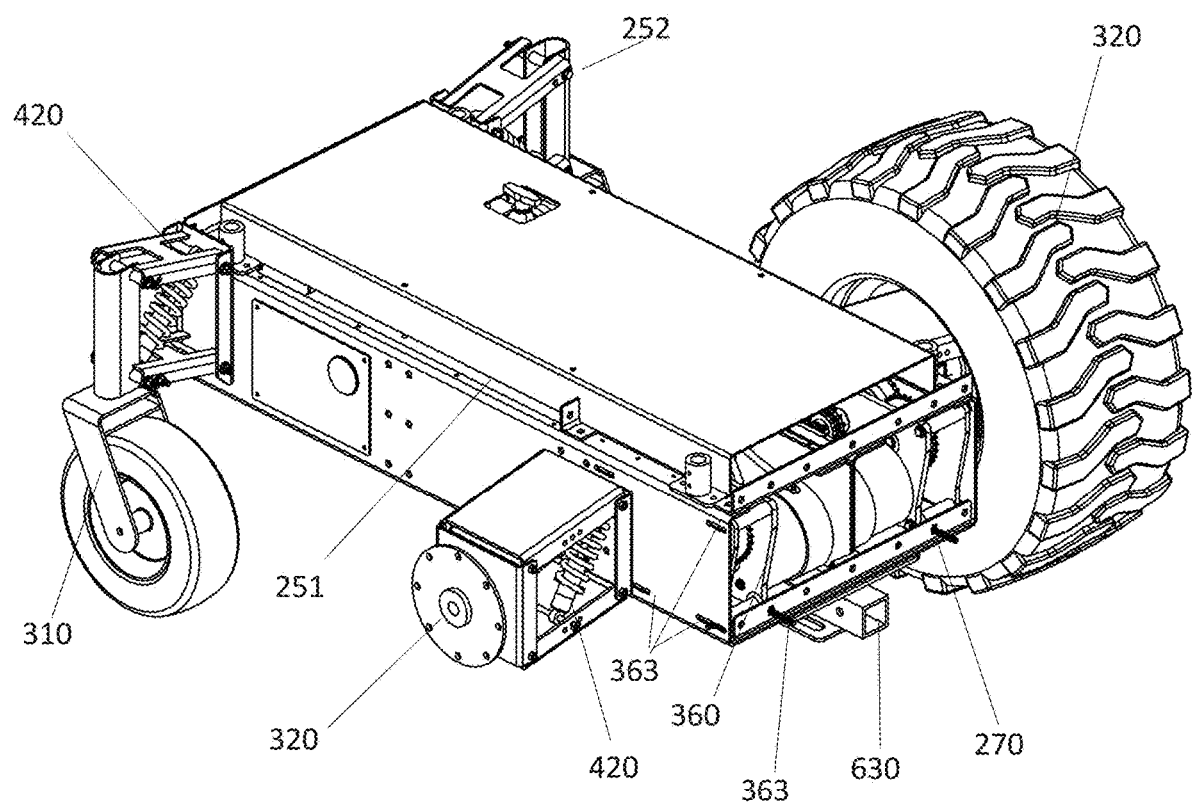
FIG. 6 is an elevated view of the LCR of the first embodiment from the rear with one rear wheel removed.

In addition to having the ability to connect apparatus accessories to both the front and back of the LCR 100, the LCR 100 is also equipped and configured to connect a standard, off the shelf front loader 610 apparatus, as shown in FIG. 5. This front loader 610 is easily connectable to the LCR 100 and again can use mostly off the shelf parts, including the loader apparatus and the gas strut. The front loader 610 also requires power to lift and lower the shovel or front loader attachment and again it is possible to power the front loader 610 entirely by using power from the LCR 100.

Although the invention has been described with reference to the preferred embodiments illustrated in the attached drawing figures it is noted that equivalents may be employed and substitutions made herein without departing from the scope of the invention as recited in the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Having thus described the various embodiments of the invention, what is claimed as new and desired to be protected by Letters Patent includes the following:

1. A method of creating a configurable, uni-member, bended frame chassis comprising the steps of:
    having a single sheet of material;
    forming holes at predetermined locations in said single sheet of material;
    using said single sheet of material and forming a base, a first side, a second side, a first top plate and a second top plate by;
        bending said material lengthwise and upwardly and forming said first side;
        bending said material lengthwise and upwardly and forming said second side; and
        having said base formed between said first side and said second side;
        bending said material lengthwise at a top of said first side and forming said first top plate;
        bending said material lengthwise at a top of said second side and forming said second top plate;
    having a variety of body parts;
    having a variety of fasteners;
    using said fasteners for securing said body parts to said chassis at said holes at said predetermined locations;
    utilizing said holes at said predetermined locations for affixing a first pair of rotatable member mounts at a first end of said first side and a first end of said second side;
    utilizing said holes at said predetermined locations for affixing a second pair of rotatable member mounts at a second end of said first side and a second end of said second side;
    affixing rotatable members to said first pair and said second pair of rotatable member mounts;
    affixing at least one power supply to said chassis; and
        powering at least one of said rotatable members via said at least one power supply.

2. The method of claim 1, further comprising the steps of:
    having at least one cross-body member;
    having a plurality of fasteners; and
    using said fasteners and affixing said at least one cross-body member in at least one location to said first side and said second side at said holes at said predetermined locations.

3. The method of creating said bended frame chassis of claim 1 further comprising the steps of:
    having and affixing at least one electric motor to said chassis;
    having and affixing at least one gearing mechanism to said chassis;
    connecting said at least one power supply to said at least one electric motor;
    connecting said at least one electric motor to said at least one gearing mechanism;
    connecting said at least one gearing mechanism to at least one of said rotatable members; and
    powering at least one of said rotatable members by said electric motor.

4. The method of creating said bended frame chassis of claim 3 further comprising the steps of:
    affixing at least one solar panel mounting apparatus to said chassis;
    affixing at least one solar panel to said at least one solar panel mounting apparatus;
    connecting said at least one solar panel to said at least one power supply; and
    charging and recharging said at least one power supply via said at least one solar panel.

5. The method of creating said bended frame chassis of claim 3 further comprising the steps of:
    having at least one bifacial solar panel;
    having and affixing at least one elevated solar panel mounting apparatus to said chassis;
    mounting said at least one bifacial solar panel to said at least one elevated solar panel mounting apparatus;

creating a space between said chassis and said at least one bifacial solar panel;
utilizing both sides of said at least one bifacial solar panel for collecting light;
connecting said at least one bifacial solar panel to said at least one power supply; and
charging and recharging said at least one power supply via said at least one bifacial solar panel.

6. A method of creating a configurable ground utility robot having a uni-member, bended frame chassis and body parts comprising the steps of: having a single sheet of material; forming holes at predetermined locations in said single sheet of material; using said single sheet of material to form a base, a first side, a second side and configuring said single sheet of material to create said chassis by; bending said material lengthwise and upwardly and forming said first side; bending said material lengthwise and upwardly and forming said second side; having said base formed between said first side and said second side; using fasteners and said holes at said predetermined locations for adding, removing or replacing ground utility robot body parts; bending said material lengthwise at a top of said first side and forming a first top plate; and bending said material lengthwise at a top of said second side and forming a second top plate; affixing at least one solar panel mounting apparatus to one or both of said first top plate and said second top plate; affixing at least one solar panel to said at least one solar panel mounting apparatus; affixing at least one power supply to said chassis; wherein said at least one power supply is at least one battery; and charging and recharging said at least one battery by said at least one solar panel.

7. The method of claim 6 further comprising the steps of: affixing a first pair of rotatable members at a first side of said chassis; affixing a second pair of rotatable members at a second side of said chassis; and powering said first pair and said second pair of rotatable members via said power supply.

8. The method of claim 6 further comprising the steps of: affixing at least one cross-body member in at least one location with fasteners to said first side and said second side at said holes at said predetermined locations.

9. The method of claim 6 further comprising the steps of: having at least one bifacial solar panel;
mounting said at least one bifacial solar panel to said at least one elevated solar panel mounting apparatus;
creating a space between said chassis and said at least one bifacial solar panel;
utilizing both sides of said at least one bifacial solar panel for collecting sunlight; and
charging and recharging said at least one battery by said at least one bifacial solar panel.

10. The method of claim 6 further comprising the steps of: affixing at least one electric motor to said chassis;
affixing at least one gearing mechanism to said chassis;
connecting said at least one electric motor to said at least one gearing mechanism and connecting said at least one gearing mechanism to said at least one rotatable member;
powering said at least one electric motor by said at least one battery;
driving said at least one gearing mechanism by said at least one electric motor; and
turning said at least one rotatable member with said at least one gearing mechanism.

11. The method of claim 10 further comprising the steps of:
affixing at least one sensor to said chassis; and
affixing at least one computer system to said chassis.

12. The method of claim 6 further comprising the steps of: having at least one hinge;
connecting said at least one hinge to said chassis and to said at least one solar panel; and
providing at least one pivoting point for lifting and lowering said at least one solar panel.

13. The method of claim 12 further comprising the steps of:
having a frame around said at least one solar panel;
having at least one actuator connected between said frame and said chassis;
using said at least one actuator for assisting with tilting, lifting and lowering said at least one solar panel.

* * * * *